(12) United States Patent
Park et al.

(10) Patent No.: US 9,809,153 B2
(45) Date of Patent: Nov. 7, 2017

(54) HEADLAMP FOR VEHICLE AND VEHICLE INCLUDING THE SAME

(71) Applicant: LG ELECTRONICS INC., Seoul (KR)

(72) Inventors: Jun Park, Seoul (KR); Byungwoo Jeoung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/249,531

(22) Filed: Aug. 29, 2016

(65) Prior Publication Data

US 2017/0113599 A1    Apr. 27, 2017

Related U.S. Application Data

(60) Provisional application No. 62/214,745, filed on Sep. 4, 2015.

(51) Int. Cl.
*B60Q 1/08* (2006.01)
*B60Q 1/00* (2006.01)
(Continued)

(52) U.S. Cl.
CPC ........... *B60Q 1/085* (2013.01); *B60Q 1/0023* (2013.01); *B60R 1/00* (2013.01); *F21S 48/1225* (2013.01); *F21S 48/1388* (2013.01); *F21S 48/1757* (2013.01); *G02B 26/0833* (2013.01); *G06K 9/00791* (2013.01); *B60Q 2300/42* (2013.01);
(Continued)

(58) Field of Classification Search
CPC .. B60Q 1/085; B60Q 1/0023; G02B 26/0833; F21S 48/1757; F21S 48/1388; F21S 48/1225; G06K 9/00791; B60R 1/00; F21Y 2115/30
See application file for complete search history.

(56) References Cited

U.S. PATENT DOCUMENTS

2013/0258689 A1   10/2013   Takahira et al.
2014/0029282 A1   1/2014    Ravier et al.
2015/0175054 A1   6/2015    Yatsuda et al.

FOREIGN PATENT DOCUMENTS

DE    102013021688    6/2015
EP    3086022         10/2016

OTHER PUBLICATIONS

Extended European Search Report in European Application No. 16186523.3, dated Feb. 6, 2017, 6 pages (with English translation).

*Primary Examiner* — Joseph L Williams
(74) *Attorney, Agent, or Firm* — Fish & Richardson P.C.

(57) ABSTRACT

A headlamp includes a light-emitting module that includes a condenser lens that defines an optical axis through a center of the condenser lens and that is configured to focus light incident on a rear surface of the condenser lens. The light-emitting module further includes a laser light source that is located behind the condenser lens and that is configured to generate light toward the condenser lens. The light-emitting module further includes a microelectromechanical system (MEMS) scanner that is located in front of the condenser lens, that is configured to reflect, toward the condenser lens, light generated by the laser light source, and that is configured to scan light generated by the laser light source by moving horizontally and vertically. The light-emitting module further includes a reflection unit that is located behind the condenser lens and that is configured to reflect light reflected by the MEMS scanner.

20 Claims, 25 Drawing Sheets

(51) Int. Cl.
*G06K 9/00* (2006.01)
*B60R 1/00* (2006.01)
*G02B 26/08* (2006.01)
*F21S 8/10* (2006.01)
*F21Y 115/30* (2016.01)

(52) U.S. Cl.
CPC ... *B60R 2300/8086* (2013.01); *F21Y 2115/30* (2016.08)

HEADLAMP FOR VEHICLE AND VEHICLE INCLUDING THE SAME

CROSS-REFERENCE TO RELATED APPLICATIONS

This application claims the benefit of Korean Patent Application No. 10-2015-0125750, filed on Sep. 4, 2015 in and U.S. Provisional Application No. 62/214,745 filed on Sep. 4, 2015, the disclosures of both are incorporated by reference.

FIELD

The present disclosure relates to a headlamp included in a vehicle.

BACKGROUND

A vehicle is an apparatus driven in a desired direction by a user. A representative example thereof is a car.

The vehicle includes a variety of lamps. For example, the vehicle includes a headlamp to sufficiently illuminate the road at night.

Light-emitting diodes or laser diodes having good energy efficiency are used a lot in lamp devices of a vehicle.

Particularly, the laser diodes have excellent directionality of light, can be projected a long distance, and do not obstruct the view of a driver of an oncoming vehicle driving in the opposite lane.

SUMMARY

According to an innovative aspect of the subject matter described in this application, a headlamp for at least one vehicle includes a light-emitting module including a condenser lens that defines an optical axis through a center of the condenser lens and that is configured to focus light incident on a rear surface of the condenser lens; a laser light source that is located behind the condenser lens and that is configured to generate light toward the condenser lens; a microelectromechanical system (MEMS) scanner that is located in front of the condenser lens, that is configured to reflect, toward the condenser lens, light generated by the laser light source, and that is configured to scan light generated by the laser light source by moving horizontally and vertically; and a reflection unit that is located behind the condenser lens and that is configured to reflect, toward the condenser lens, light reflected by the MEMS scanner.

This and other implementations may include one or more of the following optional features. The headlamp further includes an interface unit that is configured to receive oncoming vehicle detection information that is based on detecting an oncoming vehicle; and a processor that is configured to generate a control signal for switching the laser light source on or off, based on the oncoming vehicle detection information. The oncoming vehicle detection information is generated by a driver assistance apparatus that comprises a camera and that generates the oncoming vehicle detection information based on the camera capturing an image of a front of a vehicle or an image of a side of a vehicle. The light-emitting module further comprises a light source driving unit that is configured to switch the laser light source on or off based on a control signal.

The light-emitting module further comprises a scanner driving unit that is configured to drive movement of the MEMS scanner. The scanner driving unit is configured to move the MEMS scanner horizontally in response to receiving a sinusoidal waveform and move the MEMS scanner vertically in response to receiving a sawtooth waveform. The light-emitting module further comprises an auxiliary condenser lens that is configured to focus light that was reflected by the reflection unit and that passed from a back of the condenser lens to the front of the condenser lens. The laser light source and the reflection unit are offset from the optical axis. The laser light source is spaced apart from the optical axis in a first direction that is perpendicular to the optical axis. The reflection unit is spaced apart from the optical axis in a second direction that is opposite the first direction. The reflection unit is spaced apart from the optical axis in the first direction.

The laser light source and the reflection unit are located along an axis that is parallel to the optical axis of the condenser lens. The condenser lens comprises a first half and a second half that are each adjacent to the optical axis. Light generated by the laser light source is incident on the first half, light reflected by the MEMS scanner is incident on the second half, and light reflected by the reflection unit is incident on the second half. Light that is generated by the laser light source is parallel to the optical axis. The condenser lens is an aspheric lens. The aspheric lens comprises a front surface that is convex. The rear surface of the aspheric lens is perpendicular to the optical axis. Light incident to the reflection unit has a different wavelength than light reflected by the reflection unit. The reflection unit includes a wavelength conversion layer that is configured to convert a wavelength of incident light; and a reflection layer that is configured to reflect incident light. The headlamp is included in a vehicle.

According to another innovative aspect of the subject matter a headlamp for at least one vehicle includes a light-emitting module that includes a condenser lens that defines an optical axis through a center of the condenser lens and that is configured to focus light incident on a rear surface of the condenser lens; a laser light source that is located behind the condenser lens and that is configured to generate light toward the condenser lens; a reflection unit that is located in front of the condenser lens and that is configured to reflect light generated by the laser light source; a microelectromechanical system (MEMS) scanner that is located behind the condenser lens, that is configured to reflect light reflected by the reflection unit, and that is configured to scan light reflected by the reflection unit by moving horizontally and vertically; and a wavelength conversion unit that is configured to convert a wavelength of light reflected by the MEMS scanner.

This and other implementations may include one or more of the following optional features. The headlamp is included in a vehicle.

It is an object of the subject matter described in this application to provide a headlamp for vehicles, capable of implementing a beam scanning scheme using a laser light source, and a vehicle including the headlamp.

It is another object of the subject matter described in this application to provide a headlamp for vehicles, capable of being appropriately controlled in various situations.

It is another object of the subject matter described in this application to provide a light-emitting module having excellent optical efficiency, convergence, and directionality of light and capable of achieving a reduction in size

DETAILED DESCRIPTION

A vehicle described in this specification may include a car and a motorcycle. The following description is focused on a car as the vehicle.

In some implementations, a vehicle described in this specification may include all of an internal combustion engine vehicle including an engine as a power source, a hybrid vehicle including both an engine and an electric motor as power sources, and an electric vehicle including an electric motor as a power source.

For convenience of vehicle users, the vehicle includes a variety of sensors, electronic devices, etc. In some implementations, various devices are developed to assist driving of the users and various functions are provided to a headlamp of the vehicle.

Figure 1:
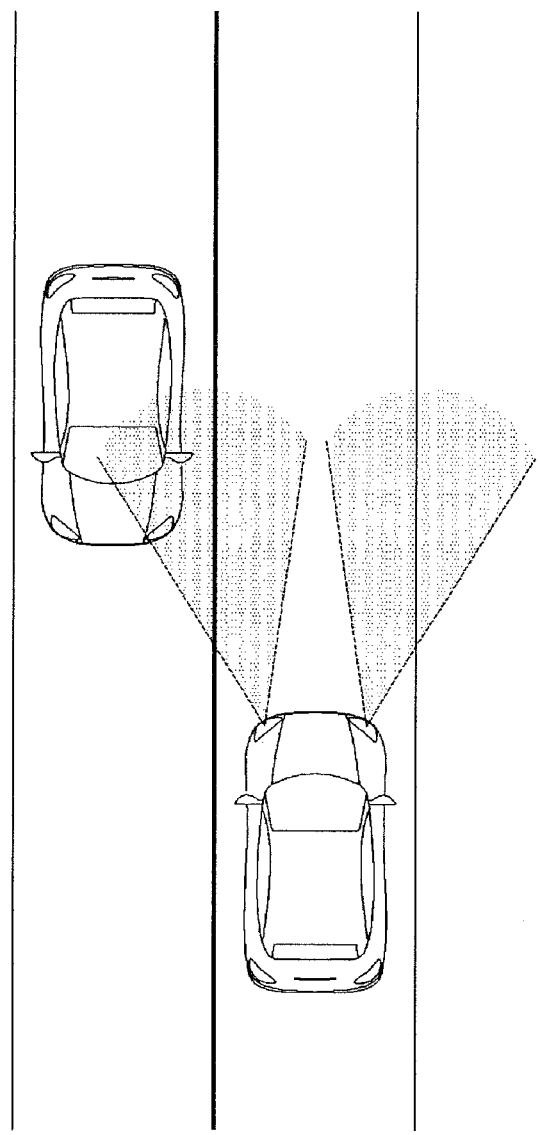
FIG. 1 is a view of an example headlamp of a vehicle that outputs high beams at night toward an oncoming vehicle driving in the opposite lane.

Among the functions of the headlamp, an adaptive driving beam (ADB) function refers to a function for outputting a high beam while driving to sufficiently illuminate the road without causing glare to a driver of an oncoming vehicle driving in the opposite lane as illustrated in FIG. 1.

FIGS. 2(a)-2(d) illustrate example ADB functions, and illustrate light output from a left headlamp. A right headlamp may output light in the same manner as the left headlamp.

Referring to FIG. 2, the ADB function is implemented using a scheme using mechanical movement (a), a scheme using matrix LEDs (b), and a scheme using pixel lights (c).

Figure 2D:
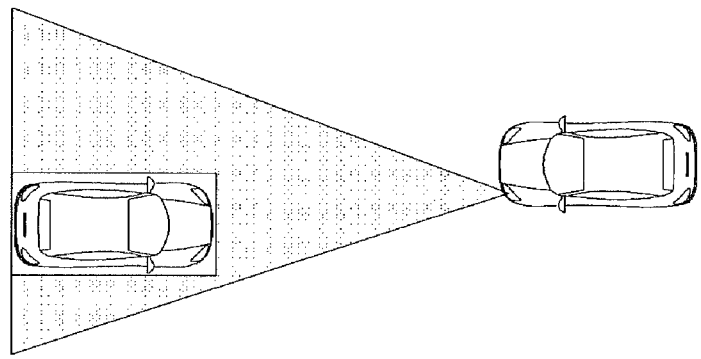
FIGS. 2(a) to 2(d) are a conceptual views of example schemes for implementing an adaptive driving beam (ADB) function.
Figure 2C:
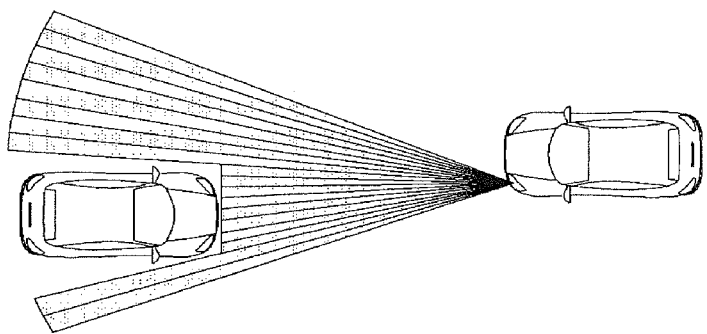
Figure 2B:
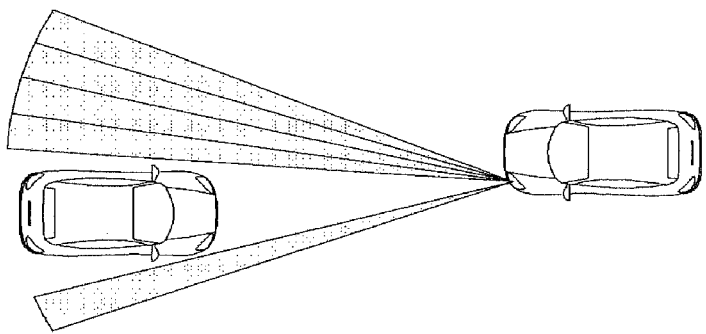
Figure 2A:
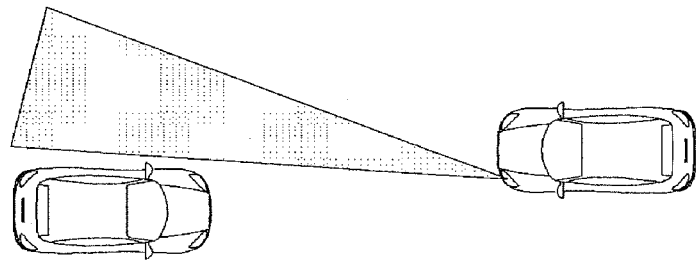

Referring to FIG. 2(a), in the scheme using mechanical movement, a mechanical device, such as a motor, rotates an LED light source not to output light toward an oncoming vehicle driving in the opposite lane.

In some implementations, rotation and response speeds are low, lighting is not soft, and optical efficiency is reduced.

In some implementations, if the LED light source is rotated to any one direction, no light is output in another direction.

Referring to FIG. 2(b), in the scheme using matrix LEDs, some of the matrix LEDs are turned off not to output light toward an oncoming vehicle driving in the opposite lane.

In some implementations, not only are multiple LEDs necessary but also a large number of optical components and a complicated structure are used to accurately drive the multiple LEDs and to output light to an accurate position.

In some implementations, the LEDs are high-priced, reliability is lowered due to excessive operation heat of the components, and an achievable resolution is limited due to spatial restrictions.

Referring to FIG. 2(c), compared to the scheme using matrix LEDs, the scheme using pixel lights uses a larger number of LED light sources to increase resolution. In the scheme using pixel lights, similarly to the scheme using matrix LEDs, some LEDs are turned off not to output light toward an oncoming vehicle driving in the opposite lane.

In some implementations, not only are multiple LEDs necessary but also a large number of optical components and a complicated structure are used to accurately drive the multiple LEDs and to output light to an accurate position.

FIG. 2(d) shows a beam scanning scheme using a laser light source.

According to the beam scanning scheme using a laser light source, an ultra-high resolution is achievable by rapidly scanning laser light, and a reduction in the number of optical components is expected.

Figure 3:
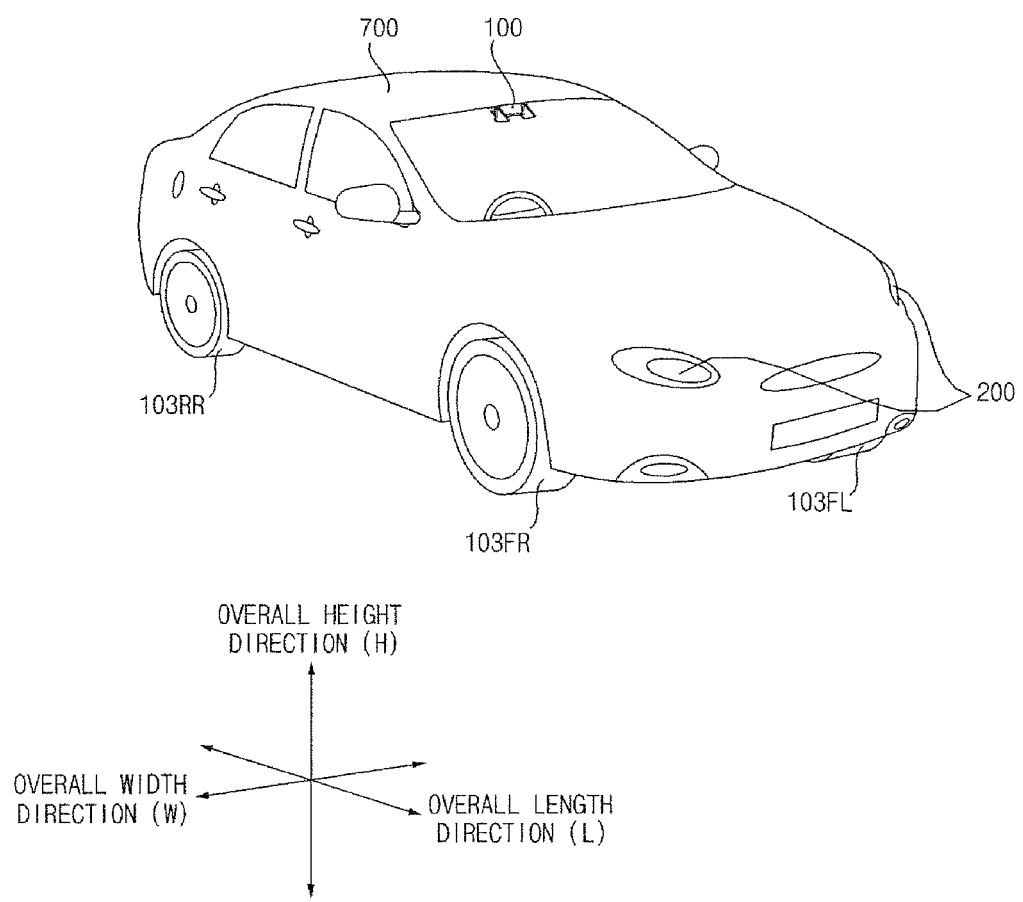
FIG. 3 is a view of an exterior of an example vehicle including a headlamp.

FIG. 3 illustrates an example vehicle 700 including a headlamp 200.

Referring to FIG. 3, the vehicle 700 may include wheels 103FR, 103FL, 103RR, . . . rotating due to power supplied from a power source, and a driver assistance apparatus 100 and an in-vehicle lamp 200 included in the vehicle 700.

Figure 6:
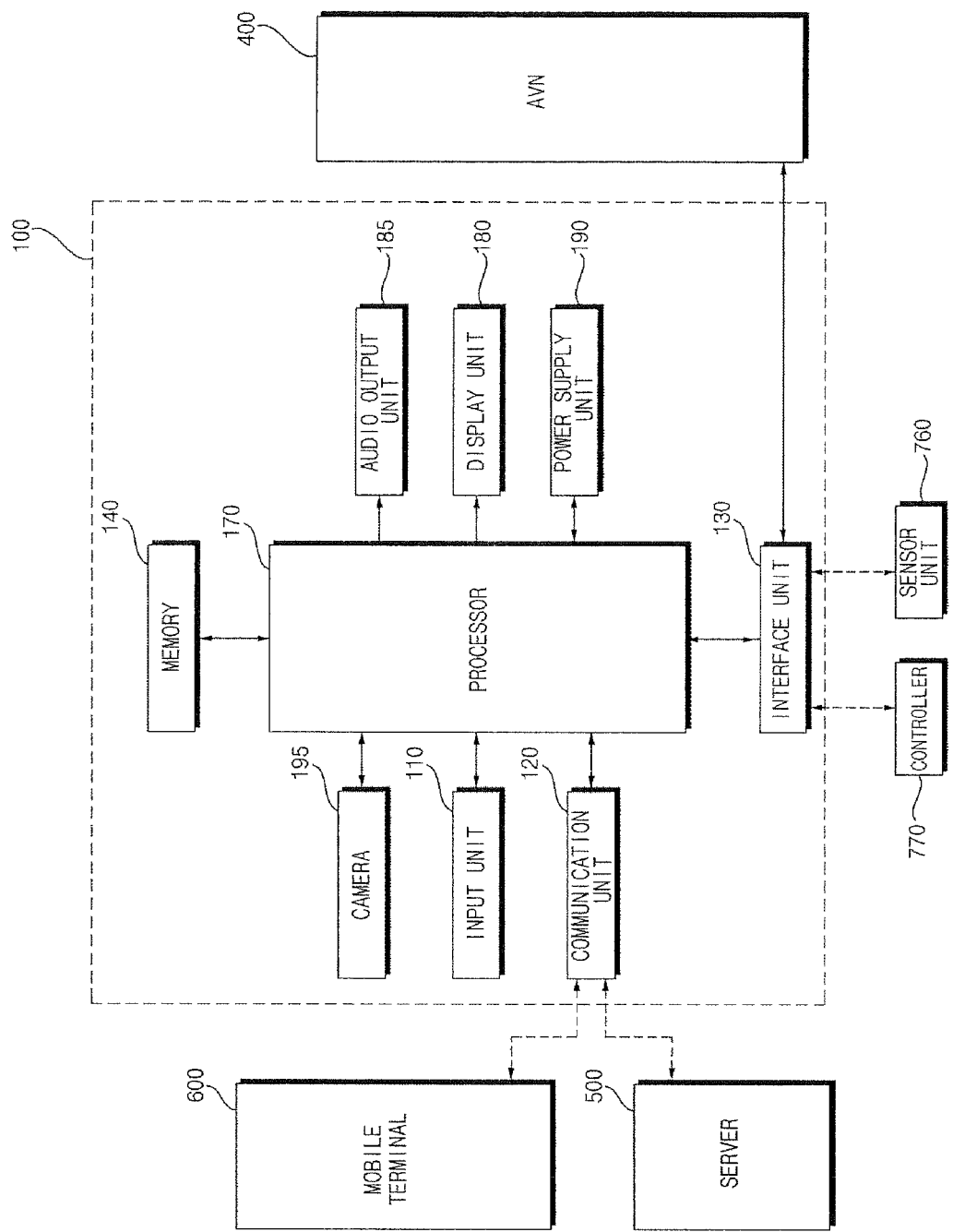
FIG. 6 is a block diagram of an example driver assistance apparatus.

The driver assistance apparatus 100 may include at least one camera, and an image obtained by the camera may be signal-processed by a processor 170 (see FIG. 6).

FIG. 3 illustrates an example driver assistance apparatus 100 that includes two cameras.

The in-vehicle lamp 200 may be one of a headlamp and a rear combination lamp. The following description assumes that the in-vehicle lamp 200 is a headlamp.

The in-vehicle lamp 200 may include two, four, or six lamps. In some implementations, light output from the in-vehicle lamp 200 may be white or yellow. In some implementations, the number of lamps or the color of light of the in-vehicle lamp 200 may vary depending on country regulations or situations.

An overall length refers to the length of the vehicle 700 from a front part to a back part, an overall width refers to the width of the vehicle 700, and an overall height refers to the height of the vehicle 700 from the bottom of the wheels to the roof. In the following description, an overall length direction L may refer to a reference direction for measuring the overall length of the vehicle 700, an overall width direction W may refer to a reference direction for measuring the overall width of the vehicle 700, and an overall height direction H may refer to a reference direction for measuring the overall height of the vehicle 700.

Figure 4:
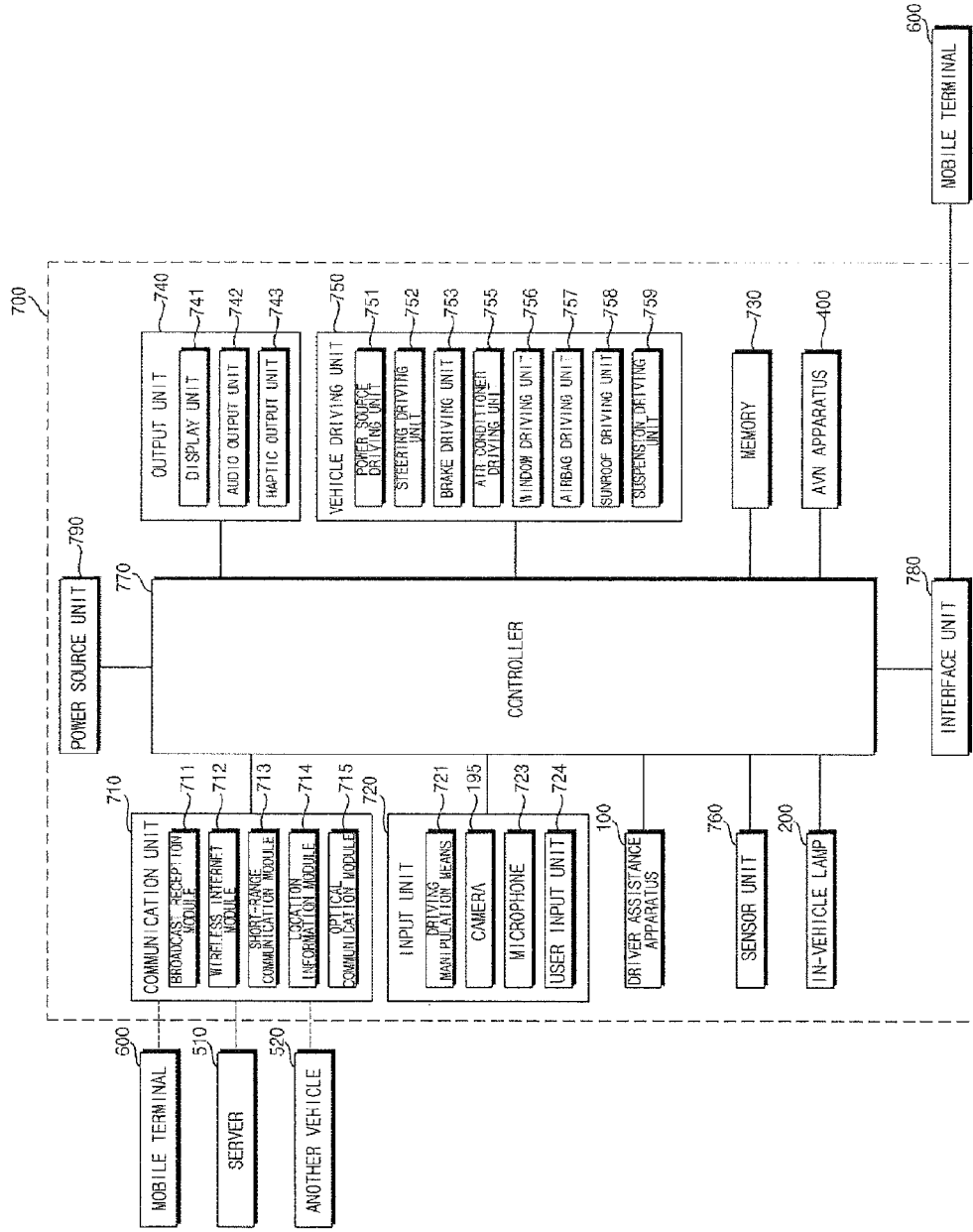
FIG. 4 is a block diagram of an example vehicle.

FIG. 4 illustrates an example vehicle 700.

Referring to FIG. 4, the vehicle 700 may include a communication unit 710, an input unit 720, a sensing unit 760, an output unit 740, a vehicle driving unit 750, a memory 730, an interface unit 780, a controller 770, a power source unit 790, the driver assistance apparatus 100, and an audio/video/navigation (AVN) apparatus 400.

The communication unit 710 may include one or more modules for enabling wireless communication between the vehicle 700 and a mobile terminal 600, between the vehicle 700 and an external server 510, or between the vehicle 700 and another vehicle 520. In some implementations, the communication unit 710 may include one or more modules for connecting the vehicle 700 to one or more networks.

The communication unit 710 may include a broadcast reception module 711, the wireless Internet module 712, a short-range communication module 713, a location information module 714, and an optical communication module 715.

The broadcast reception module 711 receives a broadcast signal or broadcast-related information through a broadcast channel from an external broadcast management server. Herein, broadcast includes radio broadcast or TV broadcast.

The wireless Internet module 712 refers to a module for wireless Internet access and may be embedded in or attached to the vehicle 700. The wireless Internet module 712 is configured to transmit and receive wireless signals in communication networks according to wireless Internet technologies.

The wireless Internet technologies include, for example, Wireless Local Area Network (WLAN), Wireless-Fidelity (Wi-Fi), Wireless-Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A), and the wireless Internet module 712 transmits and receives data according to at least one wireless Internet technology including those listed above and others. For example, the wireless Internet module 712 may wirelessly exchange data with the external server 510. The wireless Internet module 712 may receive weather information and traffic condition information (e.g., Transport Protocol Experts Group (TPEG) information) from the external server 510.

The short-range communication module 713 is used for short-range communication and may support short-range communication using at least one technology among Bluetooth™, Radio Frequency Identification (RFID), Infrared Data Association (IrDA), Ultra Wideband (UWB), ZigBee, Near Field Communication (NFC), Wireless-Fidelity (Wi-Fi), Wireless-Fidelity Direct (Wi-Fi Direct), and Wireless Universal Serial Bus (Wireless USB).

The short-range communication module 713 may form a wireless area network and perform short-range communication between the vehicle 700 and at least one external device. For example, the short-range communication module 713 may wirelessly exchange data with the mobile terminal 600. The short-range communication module 713 may receive weather information and traffic condition information (e.g., TPEG information) from the mobile terminal 600. For example, if a user gets in the vehicle 700, the mobile terminal 600 of the user and the vehicle 700 may be paired with each other automatically or when the user executes an application.

The location information module 714 is a module for acquiring location information of the vehicle 700, and a representative example thereof is a global positioning system (GPS) module. For example, if the GPS module is used, the vehicle 700 may acquire the location information of the vehicle 700 using a signal transmitted from a GPS satellite.

The optical communication module 715 may include a light transmitter and a light receiver.

The light receiver may receive information by converting a light signal into an electrical signal. The light receiver may include a photodiode (PD) for receiving light. The PD may convert light into an electrical signal. For example, the light receiver may receive information about another vehicle driving in front of the vehicle 700 using light emitted from a light source of the other vehicle.

The light transmitter may include at least one light-emitting device for converting an electrical signal into a light signal. Herein, the light-emitting device may be a light-emitting diode (LED). The light transmitter converts an electrical signal into a light signal and emits the light signal. For example, the light transmitter may emit the light signal by turning on a light-emitting device corresponding to a certain frequency. In some implementations, the light transmitter may include an array of a plurality of light-emitting devices. In some implementations, the light transmitter may be integrated with a lamp included in the vehicle 700. For example, the light transmitter may include at least one of a headlight, a taillight, a brake light, a turn signal light, and a sidelight. For example, the optical communication module 715 may exchange data with the other vehicle 520 through optical communication.

The input unit 720 may include a driving manipulation control 721, a camera 195, a microphone 723, and a user input unit 724.

The driving manipulation control 721 receives a user input for driving the vehicle 700. The driving manipulation control 721 may include a steering input control (e.g., a steering wheel), a shift input control (e.g., a gear shift), an acceleration input control (e.g., acceleration pedal), and a brake input control (e.g., brake pedal).

The steering input control receives a driving direction input of the vehicle 700 from the user. The steering input control may be provided in the form of a wheel capable of providing a steering input due to rotation. In some implementations, the steering input control may alternatively be provided in the form of a touchscreen, a touchpad, or buttons.

The shift input control receives a park (P), drive (D), neutral (N), or reverse (R) input of the vehicle 700 from the user. The shift input control may be provided in the form of a lever. In some implementations, the shift input control may alternatively be provided in the form of a touchscreen, a touchpad, or buttons.

The acceleration input control receives an input for accelerating the vehicle 700 from the user. The brake input control receives an input for decelerating the vehicle 700 from the user. The acceleration input control and the brake input control may be provided in the form of pedals. In some implementations, the acceleration input control or the brake input control may alternatively be provided in the form of a touchscreen, a touchpad, or buttons.

The camera 195 may include an image sensor and an image processing module. The camera 195 may process a still image or a moving image obtained by the image sensor (e.g., a complementary metal oxide semiconductor (CMOS) device or a charge-coupled device (CCD)). The image processing module may extract necessary information by processing the still image or the moving image obtained by the image sensor, and transmit the extracted information to the controller 770. The vehicle 700 may include the camera

195 for capturing a vehicle front side image or a vehicle peripheral image, and an internal camera 195 for capturing a vehicle inside image.

The internal camera 195 may obtain a driver or passenger image. The internal camera 195 may obtain an image for acquiring biometric information of the driver or the passenger.

Although FIG. 4 shows that the camera 195 is included in the input unit 720, the camera 195 may alternatively be included in the driver assistance apparatus 100.

The microphone 723 may process an external audio signal into electrical data. The processed data may be utilized in various ways based on a function currently performed by the vehicle 700. The microphone 723 may convert a voice command of the user into electrical data. The converted electrical data may be transmitted to the controller 770.

In some implementations, the camera 195 or the microphone 723 may not be included in the input unit 720 but may be included in the sensing unit 760.

The user input unit 724 is used to receive information from the user. If information is input through the user input unit 724, the controller 770 may control operation of the vehicle 700 to correspond to the input information. The user input unit 724 may include a touch input control or a mechanical input device. In some implementations, the user input unit 724 may be provided on a part of a steering wheel. In some implementations, the driver may manipulate the user input unit 724 with fingers while gripping the steering wheel.

The sensing unit 760 senses signals related to, for example, driving of the vehicle 700. To this end, the sensing unit 760 may include a crash sensor, a wheel sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor, a vehicle internal temperature sensor, a vehicle internal humidity sensor, an ultrasonic sensor, a radar, a lidar, etc.

As such, the sensing unit 760 may acquire sensing signals related to vehicle crash information, vehicle direction information, vehicle location information (e.g., GPS information), vehicle angle information, vehicle speed information, vehicle acceleration information, vehicle tilt information, vehicle drive/reverse information, battery information, fuel information, tire information, vehicle lamp information, vehicle internal temperature information, vehicle internal humidity information, steering wheel rotation angle information, etc.

The sensing unit 760 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), etc.

The sensing unit 760 may include a biometric information detection unit. The biometric information detection unit senses and acquires biometric information of the driver or the passenger. The biometric information may include fingerprint information, iris-scan information, retina-scan information, hand geometry information, facial recognition information, and voice recognition information. The biometric information detection unit may include a sensor for sensing the biometric information of the driver or the passenger. Herein, the internal camera 195 and the microphone 723 may operate as sensors. The biometric information detection unit may acquire the hand geometry information and the facial recognition information using the internal camera 195.

The output unit 740 is used to output information processed by the controller 770, and may include a display unit 741, an audio output unit 742, and a haptic output unit 743.

The display unit 741 may display the information processed by the controller 770. For example, the display unit 741 may display vehicle information. Herein, the vehicle information may include vehicle control information for directly controlling the vehicle 700, or driver assistance information for providing driving guide service to the driver of the vehicle 700. In some implementations, the vehicle information may include vehicle state information indicating a current state of the vehicle 700, or vehicle driving information related to driving of the vehicle 700.

The display unit 741 may include at least one of a liquid crystal display (LCD), a thin film transistor-liquid crystal display (TFT LCD), an organic light-emitting diode (OLED), a flexible display, a 3-dimensional (3D) display, and an electrophoretic ink (e-ink) display.

The display unit 741 may be layered on or integrated with a touch sensor, and thus may implement a touchscreen. The touchscreen may serve as the user input unit 724 for providing an input interface between the vehicle 700 and the user and, at the same time, provide an output interface between the vehicle 700 and the user. In some implementations, the display unit 741 may include a touch sensor for sensing touch on the display unit 741, and thus may receive a control command input using the touch. As such, if the display unit 741 is touched, the touch sensor may sense the touch and the controller 770 may generate a control command corresponding to the touch. An input using touch may be, for example, text, a number, or a menu item indictable or specifiable in various modes.

The display unit 741 may include a cluster such that the driver may check the vehicle state information or the vehicle driving information immediately after the driver starts driving. The cluster may be located on a dashboard. In some implementations, the driver may check the information displayed on the cluster while continuously looking ahead.

In some implementations, the display unit 741 may be implemented as a head up display (HUD). If the display unit 741 is implemented as a HUD, the display unit 741 may output the information using a transparent display included in a windshield. In some implementations, the display unit 741 may include a projection module and thus may output the information using an image projected onto the windshield.

The audio output unit 742 converts an electrical signal received from the controller 770, into an audio signal, and outputs the audio signal. To this end, the audio output unit 742 may include, for example, a speaker. The audio output unit 742 may also output sound corresponding to operation of the user input unit 724.

The haptic output unit 743 generates a haptic output. For example, the haptic output unit 743 may vibrate a steering wheel, a seat belt, or a seat to make the user recognize the output.

The vehicle driving unit 750 may control operations of various apparatuses included in the vehicle 700. The vehicle driving unit 750 may include a power source driving unit 751, a steering driving unit 752, a brake driving unit 753, the lamp driving unit 754, the air-conditioner driving unit 755, the window driving unit 756, an airbag driving unit 757, the sunroof driving unit 758, and a suspension driving unit 759.

The power source driving unit 751 may electronically control a power source included in the vehicle 700.

For example, if an engine based on fossil fuel is the power source, the power source driving unit 751 may electronically control the engine. As such, the power source driving unit 751 may control, for example, an output torque of the engine. When the power source driving unit 751 is an engine, the power source driving unit 751 may limit the speed of the vehicle 700 by restricting an output torque of the engine under control of the controller 770.

As another example, if a motor based on electricity is the power source, the power source driving unit 751 may control the motor. As such, the power source driving unit 751 may control, for example, the speed and torque of the motor.

The steering driving unit 752 may electronically control a steering apparatus included in the vehicle 700. As such, the steering driving unit 752 may change the driving direction of the vehicle 700.

The brake driving unit 753 may electronically control a brake apparatus included in the vehicle 700. For example, the brake driving unit 753 may control operation of brakes provided on wheels, and thus reduce the speed of the vehicle 700. As another example, the brake driving unit 753 may differently control operations of brakes provided on a left wheel and a right wheel, and thus may adjust the driving direction of the vehicle 700 to the left or right.

The air-conditioner driving unit 755 may electronically control an air-conditioner included in the vehicle 700. For example, if the temperature inside the vehicle 700 is high, the air-conditioner driving unit 755 may control the air-conditioner to supply cool air into the vehicle 700.

The window driving unit 756 may electronically control a window apparatus included in the vehicle 700. For example, the window driving unit 756 may control left and right windows of the vehicle 700 to be opened or closed.

The airbag driving unit 757 may electronically control an airbag apparatus included in the vehicle 700. For example, the airbag driving unit 757 may control an airbag to inflate when the vehicle 700 crashes.

The sunroof driving unit 758 may electronically control a sunroof apparatus included in the vehicle 700. For example, the sunroof driving unit 758 may control the sunroof to be opened or closed.

The suspension driving unit 759 may electronically control a suspension apparatus included in the vehicle 700. For example, the suspension driving unit 759 may control the suspension apparatus on a bumpy road to reduce impact applied to the vehicle 700.

The memory 730 is electrically connected to the controller 770. The memory 730 may store basic data about each element, control data for controlling operation of each element, and input and output data. The memory 730 may include a variety of storage devices such as a ROM, a RAM, an EPROM, a flash drive, and a hard drive, in terms of hardware. The memory 730 may store various types of data for overall operation of the vehicle 700, e.g., programs for processing or control operations of the controller 770.

The interface unit 780 may serve as a path to various external devices connected to the vehicle 700. For example, the interface unit 780 may include a port connectable to the mobile terminal 600, and may be connected through the port to the mobile terminal 600. In some implementations, the interface unit 780 may exchange data with the mobile terminal 600.

The interface unit 780 may serve as a path for supplying electrical energy to the connected mobile terminal 600. If the mobile terminal 600 is electrically connected to the interface unit 780, the interface unit 780 provides electrical energy supplied from the power source unit 790, to the mobile terminal 600 under control of the controller 770.

The controller 770 may control overall operation of elements included in the vehicle 700. The controller 770 may be called an electronic control unit (ECU).

The controller 770 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing other functions, in terms of hardware.

The power source unit 790 may supply power necessary for operation of each element under control of the controller 770. Particularly, the power source unit 790 may receive power supplied from, for example, a battery included in the vehicle 700.

The driver assistance apparatus 100 may exchange data with the controller 770. A control signal generated by the driver assistance apparatus 100 may be output to the controller 770.

The AVN apparatus 400 may exchange data with the controller 770.

Figure 5:
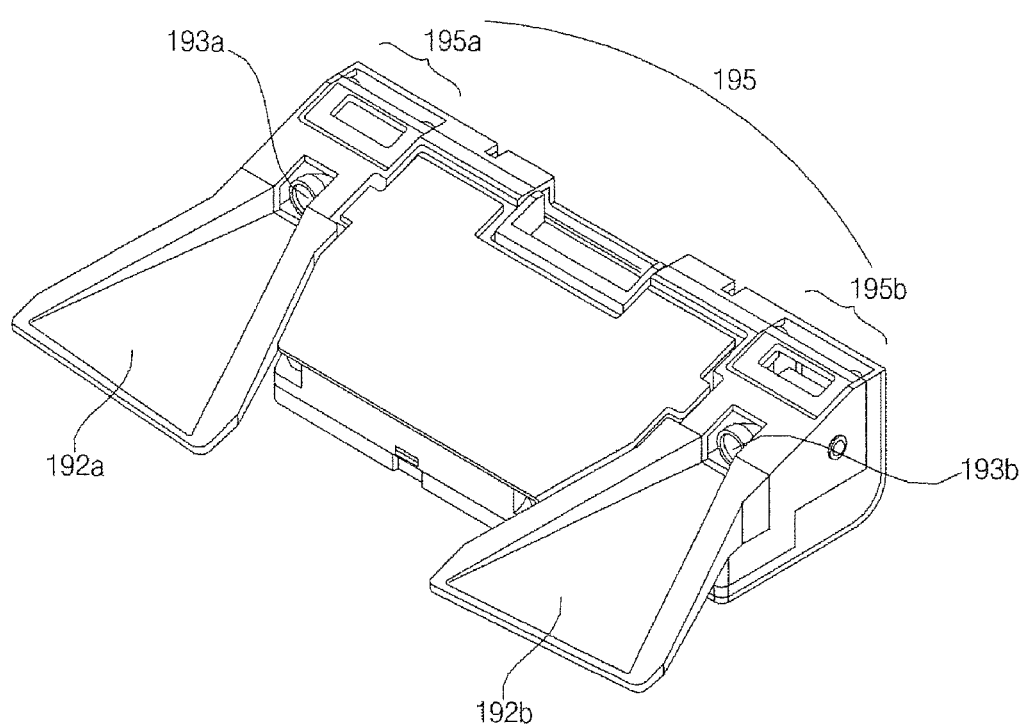
FIG. 5 is a view of an exterior of an example driver assistance apparatus.

FIG. 5 illustrates an example driver assistance apparatus 100.

Although FIG. 5 shows that the driver assistance apparatus 100 includes two cameras, more cameras may be included.

Referring to FIG. 5, the driver assistance apparatus 100 may include a first camera 195a including a first lens 193a, and a second camera 195b including a second lens 193b.

The driver assistance apparatus 100 may include a first light shield 192a and a second light shield 192b for shielding light from being incident on the first and second lenses 193a and 193b, respectively.

The driver assistance apparatus 100 illustrated in FIG. 5 may be attachable to the roof or the windshield of the vehicle 700.

The driver assistance apparatus 100 may obtain a stereo image of a front side of the vehicle 700 from the first and second cameras 195a and 195b, detect disparity information based on the stereo image, detect an object in at least one image included in the stereo image based on the disparity information, and track motion of the object after the object is detected.

In some implementations, the distance from the vehicle 700 may be calculated to be small if a disparity level is large, and may be calculated to be large if the disparity level is small.

FIG. 6 illustrates an example driver assistance apparatus 100.

Referring to FIG. 6, the driver assistance apparatus 100 may generate vehicle information by signal-processing an image received from the camera 195, based on computer vision. Herein, the vehicle information may include vehicle control information for directly controlling the vehicle 700, or driver assistance information for providing driving guide service to the driver of the vehicle 700.

Herein, the camera 195 may be a mono camera. In some implementations, the camera 195 may be the stereo cameras 195a and 195b for capturing a vehicle front side image. Otherwise, the camera 195 may be an around view camera for capturing a vehicle peripheral image.

The driver assistance apparatus 100 may include an input unit 110, a communication unit 120, an interface unit 130, a memory 140, a processor 170, a power supply unit 190, a camera 195, a display unit 180, and an audio output unit 185.

The input unit 110 may include a plurality of buttons or a touchscreen attached to the driver assistance apparatus 100 and, more particularly, to the camera 195. Using the buttons or the touchscreen, the driver assistance apparatus 100 may be powered on. In some implementations, a variety of input operations may be performed.

The communication unit 120 may exchange data with the mobile terminal 600 or the server 500 using a wireless scheme. Particularly, the communication unit 120 may exchange data with a mobile terminal of the driver of the vehicle 700 using a wireless scheme. The wireless data communication scheme includes various data communication schemes such as Bluetooth, Wi-Fi Direct, Wi-Fi, APiX, and NFC.

The communication unit 120 may receive weather information and traffic condition information (e.g., TPEG information) from the mobile terminal 600 or the server 500. Real-time information acquired by the driver assistance apparatus 100 may be transmitted to the mobile terminal 600 or the server 500.

If a user gets in the vehicle 700, the mobile terminal 600 of the user and the driver assistance apparatus 100 may be paired with each other automatically or when the user executes an application.

The interface unit 130 may receive data related to the vehicle 700 or transmit a signal processed or generated by the processor 270, to the outside. To this end, the interface unit 130 may perform data communication with the controller 770, the AVN apparatus 400, the sensor unit 760, etc. of the vehicle 700 using a wired or wireless communication scheme.

The interface unit 130 may receive sensor information from the controller 770 or the sensor unit 760.

Herein, the sensor information may include at least one of vehicle direction information, vehicle location information (e.g., GPS information), vehicle angle information, vehicle speed information, vehicle acceleration information, vehicle tilt information, vehicle drive/reverse information, battery information, fuel information, tire information, vehicle lamp information, vehicle internal temperature information, and vehicle internal humidity information.

The sensor information may be acquired using a heading sensor, a yaw sensor, a gyro sensor, a position module, a vehicle drive/reverse sensor, a wheel sensor, a vehicle speed sensor, a vehicle tilt sensor, a battery sensor, a fuel sensor, a tire sensor, a steering sensor, vehicle internal temperature sensor, a vehicle internal humidity sensor, etc. The position module may include a GPS module for receiving GPS information.

In the sensor information, the vehicle direction information, the vehicle location information, the vehicle angle information, the vehicle speed information, and the vehicle tilt information related to driving of the vehicle 700 may be called vehicle driving information.

The memory 140 may store various types of data for overall operation of the driver assistance apparatus 100, e.g., programs for processing or control operations of the processor 170.

The memory 140 may include a variety of storage devices such as a read-only memory (ROM), a random access memory (RAM), an erasable programmable read-only memory (EPROM), a flash drive, and a hard drive, in terms of hardware The processor 170 controls overall operation of elements of the driver assistance apparatus 100.

The processor 170 may process a vehicle front side image or a vehicle peripheral image obtained by the camera 195. Particularly, the processor 170 performs signal processing based on computer vision. As such, the processor 170 may obtain the vehicle front side image or the vehicle peripheral image from the camera 195, and perform object detection and object tracking based on the obtained image. For object detection, the processor 170 may perform lane detection (LD), vehicle detection (VD), pedestrian detection (PD), bright-spot detection (BD), traffic signal recognition (TSR), or road surface detection.

The processor 170 may be implemented using at least one of ASICs, DSPs, DSPDs, PLDs, FPGAs, processors, controllers, microcontrollers, microprocessors, and electrical units for performing other functions.

The processor 170 may be controlled by the controller 770.

The display unit 180 may display various types of information processed by the processor 170. The display unit 180 may display an image related to operation of the driver assistance apparatus 100. To display the image, the display unit 180 may include a cluster or a head up display (HUD) provided at a front part in the vehicle 700. If the display unit 180 is a HUD, the display unit 180 may include a projection module for projecting an image onto the windshield of the vehicle 700.

The audio output unit 185 may output sound based on an audio signal processed by the processor 170. To this end, the audio output unit 185 may include at least one speaker.

An audio input unit may receive an audio input of the user. To this end, the audio input unit may include a microphone. The received audio input may be converted into an electrical signal and the electrical signal may be transmitted to the processor 170.

The power supply unit 190 may supply power necessary for operation of each element, under control of the processor 170. Particularly, the power supply unit 190 may receive power supplied from, for example, a battery included in the vehicle 700.

The camera 195 obtains a vehicle front side image or a vehicle peripheral image. The camera 195 may be a mono camera or the stereo cameras 195a and 195b for capturing the vehicle front side image. In some implementations, the camera 195 may include multiple cameras for capturing the vehicle peripheral image.

The camera 195 may include an image sensor (e.g., a CMOS device or a CCD) and an image processing module.

The camera 195 may process a still image or a moving image obtained by the image sensor. The image processing module may process the still image or the moving image obtained by the image sensor. In some implementations, the image processing module may be separate from or integrated with the processor 170.

If the driver assistance apparatus 100 includes the stereo cameras 195a and 195b, the processor 170 performs signal processing based on computer vision. As such, the processor 170 may obtain a stereo image of a front side of the vehicle 700 from the stereo cameras 195a and 195b, calculate disparity information based on the stereo image, detect an object in at least one image included in the stereo image based on the calculated disparity information, and track motion of the object after the object is detected. Herein, the stereo image is generated using a first image received from the first camera 195a and a second image received from the second camera 195b.

In some implementations, the processor 170 may calculate the distance to a detected adjacent vehicle, calculate the speed of the detected adjacent vehicle, and calculate a relative speed compared to the detected adjacent vehicle.

Figure 7:
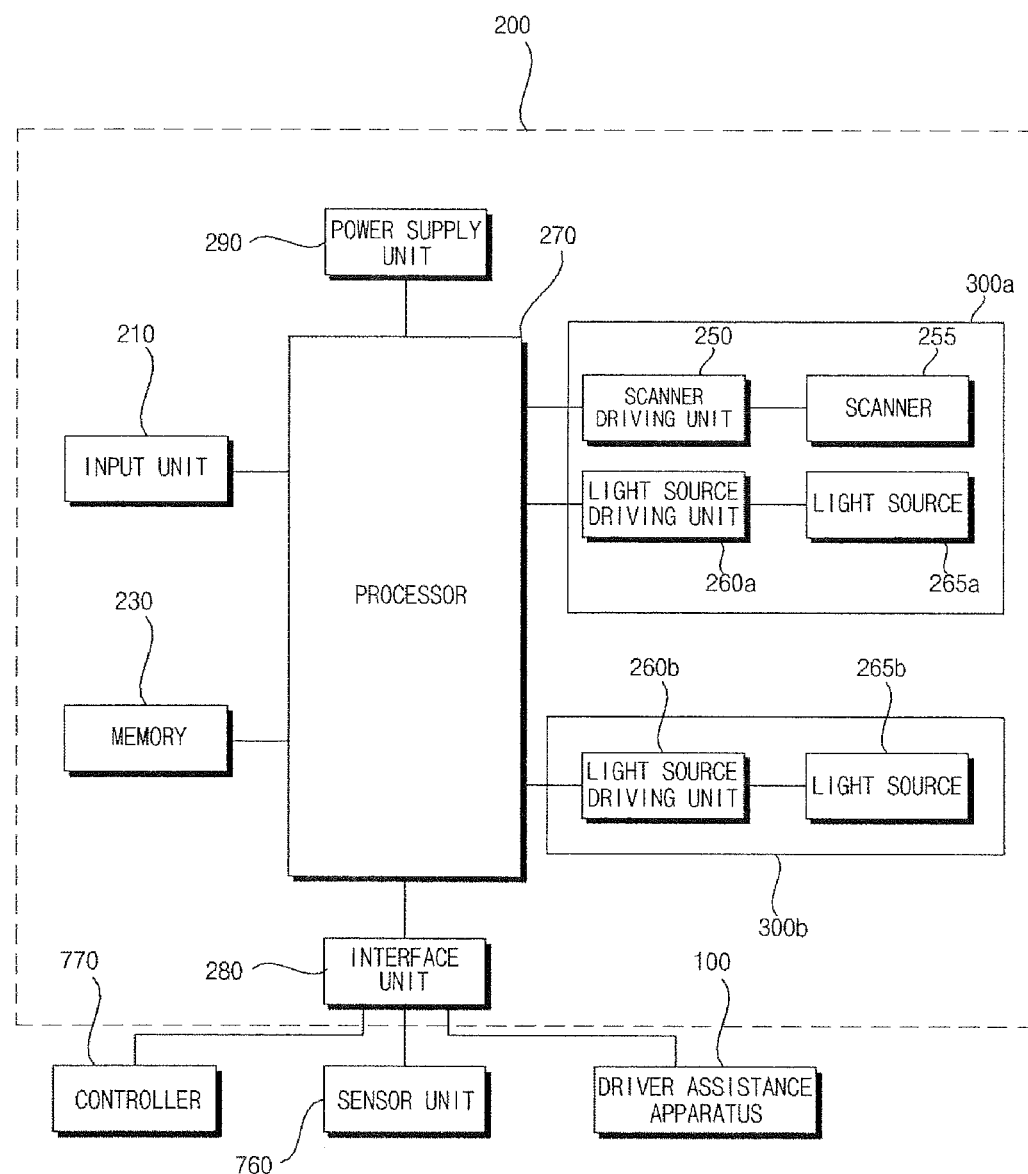
FIG. 7 is a block diagram of an example in-vehicle lamp.

FIG. 7 illustrates an example in-vehicle lamp 200.

Referring to FIG. 7, a description is now given of the in-vehicle lamp 200 in terms of control.

The in-vehicle lamp 200 may include an input unit 210, a memory 230, a first light-emitting module 300a, a second light-emitting module 300b, a processor 270, an interface unit 280, and a power supply unit 290.

The input unit 210 may include an input control capable of receiving a user input for controlling operation of the in-vehicle lamp 200. The input unit 210 may be included in the vehicle 700. The input unit 210 may include a touch input control or a mechanical input device. The input unit 210 may receive a user input for turning on or off the in-vehicle lamp 200. The input unit 210 may receive user inputs for controlling a variety of operations of the in-vehicle lamp 200.

The input unit 210 may receive user inputs for controlling the first and second light-emitting modules 300a and 300b.

The memory 230 may store basic data about each element of the in-vehicle lamp 200, control data for controlling operation of each element, and data input to and output from the in-vehicle lamp 200.

The memory 230 may include a variety of storage devices such as a ROM, a RAM, an EPROM, a flash drive, and a hard drive, in terms of hardware.

The memory 230 may store various types of data for overall operation of the in-vehicle lamp 200, e.g., programs for processing or control operations of the processor 270.

The first light-emitting module 300a may include a scanner 255, a light source driving unit 260a, and a light source 265a.

The light source driving unit 260a may control the light source 265a based on a control signal received from the processor 170. In some implementations, the light source driving unit 260a applies a driving current to the light source 265a based on the control signal. Based on the driving current applied from the light source driving unit 260a, light emitted from the light source 265a may be controlled.

Herein, the light source 265a may be a laser diode, and the light source driving unit 260a may be a laser diode driver.

The scanner 255 may be a microelectromechanical system (MEMS) scanner. Detailed descriptions of the structure and operation of the scanner 255 will be given below with reference to FIGS. 10 to 14.

In some implementations, the first light-emitting module 300a may further include a scanner driving unit 250 for driving the scanner 255, and the processor 270 may control the scanner driving unit 250 for controlling the scanner 255.

The scanner driving unit 250 may include a sine wave generator circuit, a triangular wave generator circuit, a signal combining circuit, etc., and generate a driving frequency for driving the scanner 255 based on a received scanner driving signal, and the scanner 255 may be horizontally and vertically driven to scan light based on horizontal and vertical driving frequencies.

The scanner driving unit 250 may drive the horizontal direction scanning operation based on a sinusoidal waveform, and drive the vertical direction scanning operation based on a sawtooth waveform.

The scanner driving unit 250 may generate a signal for driving the MEMS scanner 255. In some implementations, the scanner driving unit 250 may sense motion of and control a driving algorithm of the scanner 255.

The first light-emitting module 300a may be a high beam emission module.

The second light-emitting module 300b may include a light source driving unit 260b, a light source 265b, a reflector, and a lens.

The light source driving unit 260b may control the light source 265b based on a control signal received from the processor 170. In some implementations, the light source driving unit 260b applies a driving current to the light source 265b based on the control signal. Based on the driving current applied from the light source driving unit 260b, light emitted from the light source 265b may be controlled.

The light source 265b may generate light. The light source 265b may convert electrical energy into light energy. The light source 265b may include one of a metal filament lamp, a halogen bulb, a high intensity discharge (HID) lamp, a neon gas discharge lamp, a light-emitting diode (LED), and a laser diode.

The light generated by the light source 265b may be projected toward the front side of the vehicle 700 directly or after being reflected by the reflector.

The reflector may reflect the light generated by the light source 265b to induce the light to be projected toward the front side of the vehicle 700. The reflector may be produced using a material having good reflectance, e.g., aluminum (Al) or silver (Ag), or may be coated on a light reflecting surface.

The lens is provided in front of the light source 265b and the reflector. The lens refracts and transmits the light emitted from the light source 265b or the light reflected by the reflector. The lens may be an aspherical lens.

In some implementations, the second light-emitting module 300b may not include the lens.

The in-vehicle lamp 200 may further include a cover lens. The cover lens covers an opening of a housing which configures the exterior of the in-vehicle lamp 200. The cover lens is formed of transparent plastic or glass. In general, the cover lens is formed of ALDC plastic having excellent thermal conductivity.

The second light-emitting module 300b may be a low beam emission module. If the second light-emitting module 300b generates a low beam, the second light-emitting module 300b includes a light shielding cap to prevent upward emission of light.

In some implementations, the in-vehicle lamp 200 may include a plurality of first light-emitting modules 300a and/or a plurality of second light-emitting modules 300b.

The first and second light-emitting modules 300a and 300b may be configured differently. For example, the in-vehicle lamp 200 may include two first light-emitting modules 300a. In some implementations, the in-vehicle lamp 200 may include one first light-emitting module 300a.

The processor 270 may control overall operation of elements included in the in-vehicle lamp 200.

The processor 270 may output a control signal to the scanner driving unit 250 to control operation or the state of the scanner 255.

The processor 270 may output a control signal to the light source driving unit 260a or 260b to control operation or the state of the light source 265a or 265b.

The processor 270 may be controlled by the controller 770 of the vehicle 700.

The processor 270 may be implemented using at least one of ASICs, DSPs, DSPDs, PLDs, FPGAs, processors, controllers, microcontrollers, microprocessors, and electrical units for performing other functions, in terms of hardware.

The interface unit 280 may receive data or user input related to the vehicle 700 or transmit a signal processed or generated by the processor 270, to the outside. To this end, the interface unit 130 may perform data communication with the controller 770, the sensor unit 760, the driver assistance apparatus 100, etc. of the vehicle 700 using a wired or wireless communication scheme.

The interface unit 280 may receive sensor information from the controller 770 or the sensor unit 760.

Herein, the sensor information may include at least one of vehicle direction information, vehicle location information (e.g., GPS information), vehicle angle information, vehicle speed information, vehicle acceleration information, vehicle tilt information, vehicle drive/reverse information, battery information, fuel information, tire information, vehicle lamp information, vehicle internal temperature information, and vehicle internal humidity information.

The sensor information may be acquired using a heading sensor, a yaw sensor, a gyro sensor, a position module, a vehicle drive/reverse sensor, a wheel sensor, a vehicle speed sensor, a vehicle tilt sensor, a battery sensor, a fuel sensor, a tire sensor, a steering sensor, a vehicle internal temperature sensor, a vehicle internal humidity sensor, etc. The position module may include a GPS module for receiving GPS information.

In the sensor information, the vehicle direction information, the vehicle location information, the vehicle angle information, the vehicle speed information, and the vehicle tilt information related to driving of the vehicle 700 may be called vehicle driving information.

The interface unit 280 may receive object information detected by the driver assistance apparatus 100, from the controller 770 or the driver assistance apparatus 100.

The driver assistance apparatus 100 may perform lane detection (LD), vehicle detection (VD), pedestrian detection (PD), bright-spot detection (BD), traffic signal recognition (TSR), or road surface detection based on the obtained vehicle front side image. The interface unit 280 may receive the detected object information from the driver assistance apparatus 100. In some implementations, the interface unit 280 may receive the detected object information via the controller 770.

For example, if the driver assistance apparatus 100 detects an oncoming vehicle driving in the opposite lane, the interface unit 280 may receive oncoming vehicle detection information. Herein, the oncoming vehicle detection information may include location information of the oncoming vehicle, and relative distance information and relative speed information between the vehicle 700 and the oncoming vehicle.

The power supply unit 290 may supply power necessary for operation of each element of the in-vehicle lamp 200, under control of the processor 270. Particularly, the power supply unit 290 may receive power supplied from, for example, a battery included in the vehicle 700.

Figure 8:
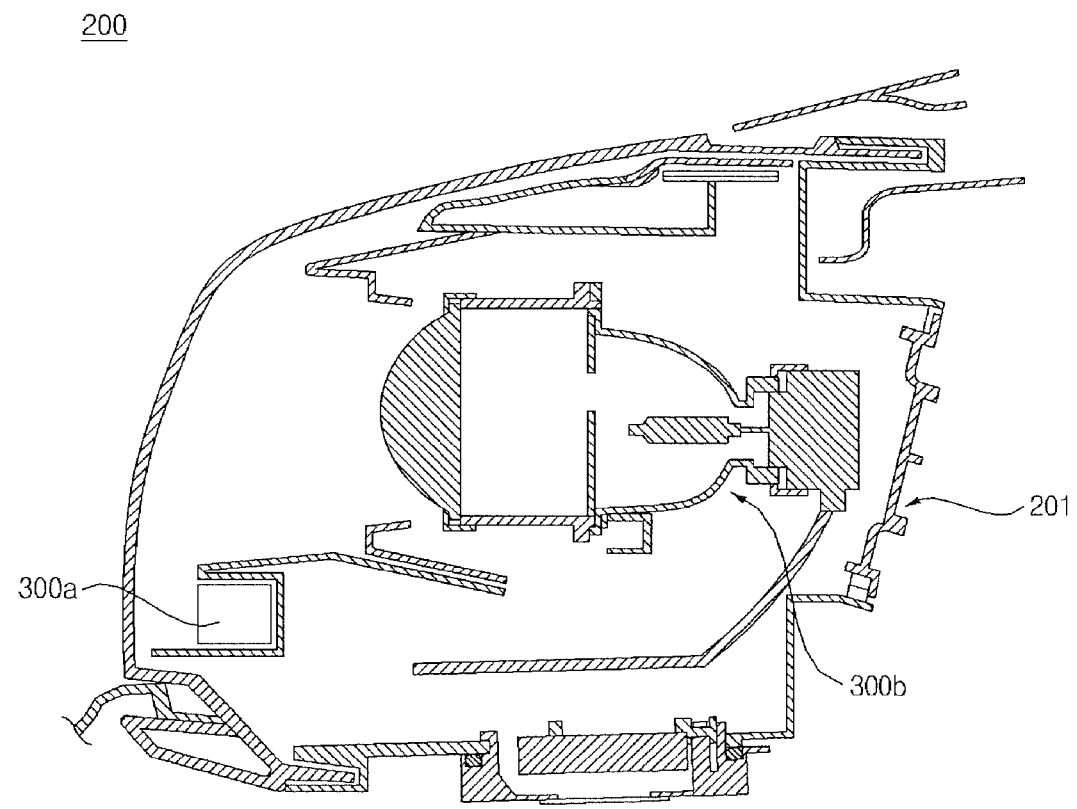
FIG. 8 is a reference view of an example headlamp for vehicles.

FIG. 8 illustrates an example headlamp for vehicles.

A description is now given of the headlamp in terms of structure with reference to FIG. 8.

Referring to FIG. 8, the in-vehicle lamp 200 includes a lamp housing 201 the first light-emitting module 300*a* located inside the lamp housing 201.

In some implementations the in-vehicle lamp 200 may further include the second light-emitting module 300*b*.

The lamp housing 201 provides a space for accommodating the first light-emitting module 300*a* or/and the second light-emitting module 300*b*.

Herein, the first and second light-emitting modules 300*a* and 300*b* may emit the same wavelength of light. In some implementations, the first and second light-emitting modules 300*a* and 300*b* may generate different colors of light, or generate plane light and point light.

The light generated by the second light-emitting module 300*b* has excellent diffusivity and thus may be projected to a short-distance area, and the light generated by the first light-emitting module 300*a* has excellent directionality and thus may be projected to a long-distance small area. In some implementations, the first light-emitting module 300*a* may use a laser diode as a light source thereof, and the second light-emitting module 300*b* may use a xenon lamp as a light source thereof.

Figure 9:
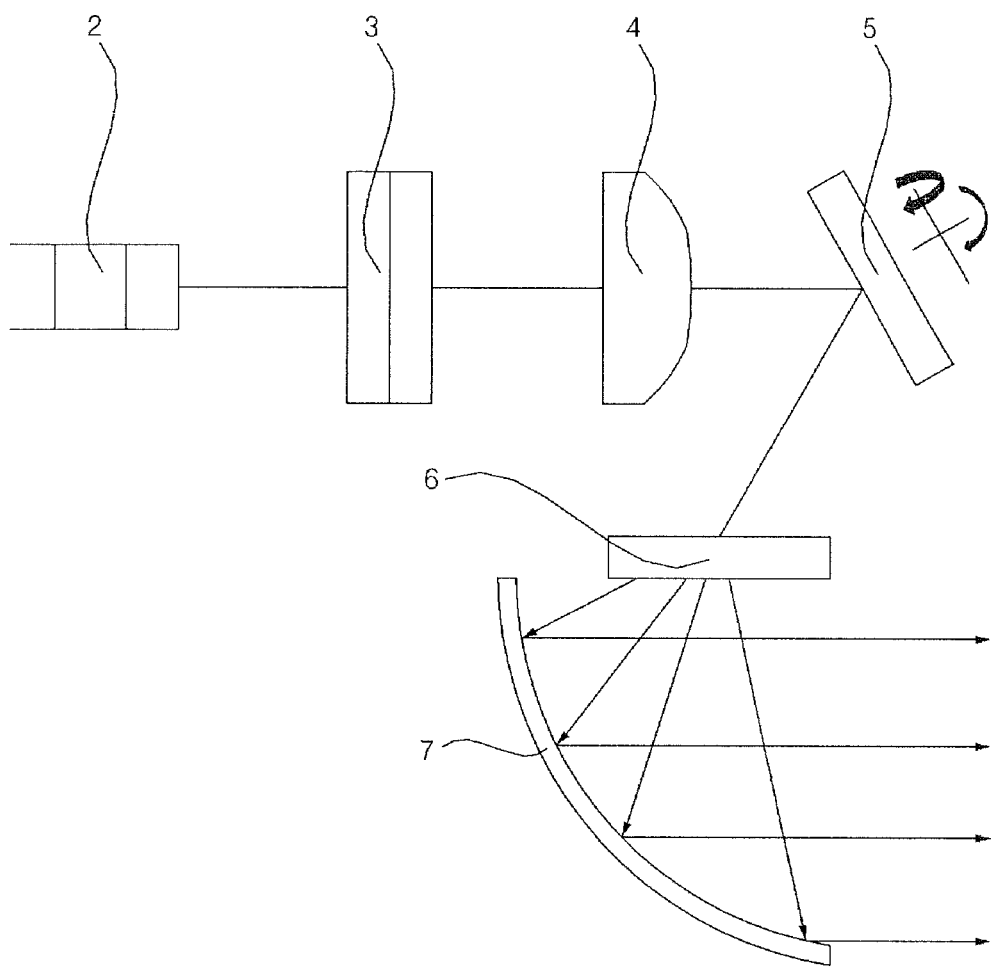
FIG. 9 is a conceptual view of an example light-emitting module.

FIG. 9 illustrates an example light-emitting module.

Referring to FIG. 9, the light-emitting module may include optical components such as a laser light source 2, a prism 3, a lens 4, and a reflection unit 7, a MEMS scanner 5, and a transmissive phosphor 6.

Blue light generated by the laser diode 2 is focused through the prism 3 and the lens 4, and the focused light is scanned by the MEMS scanner 5 in vertical and horizontal directions.

The light scanned by the MEMS scanner 5 is converted into white light through the transmissive phosphor 6, and the converted white light is emitted in a front direction by the reflection unit 7.

Accordingly, a front side of the vehicle 700 may be scanned and a high beam may be output using only a small number of laser light sources 2.

However, the light-emitting module of FIG. 9 uses a plurality of components and a small headlamp may not be produced due to the size of each component and an optical path along which light passes through each component only once. Accordingly, an example headlamp structure with reference to FIGS. 15 to 24 may be used.

Figure 10:
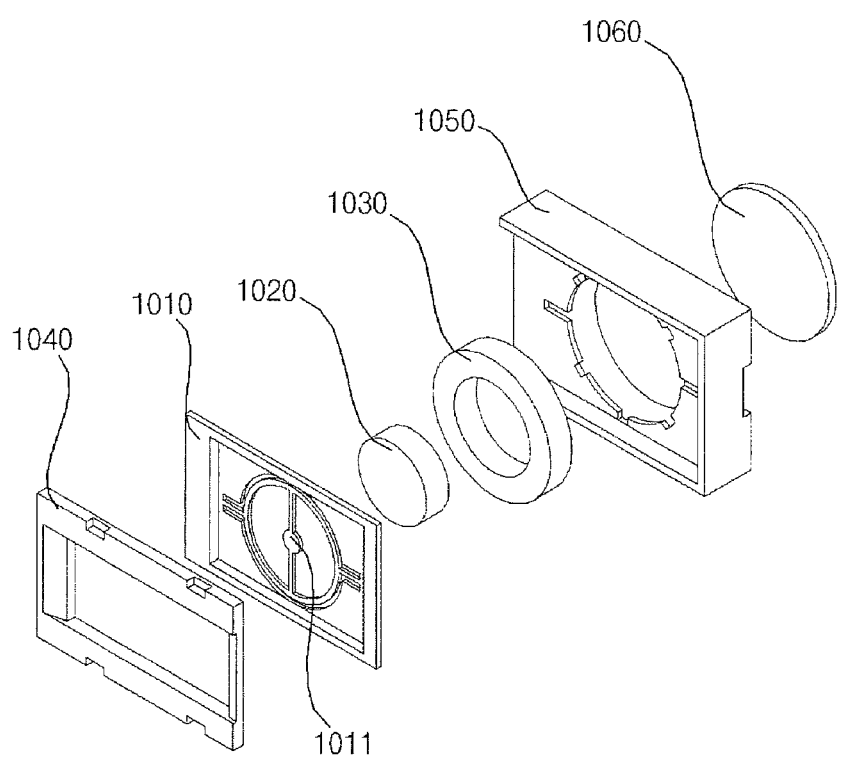
FIG. 10 is a reference view of an example microelectromechanical system (MEMS) scanner package.

FIG. 10 illustrates an example MEMS scanner package.

Referring to FIG. 10, the MEMS scanner package may include a MEMS scanner 1010 including a mirror 1011 for reflecting light, an inner magnet 1020 provided to face a rear surface of the mirror 1011, and an outer magnet 1030 provided outside the inner magnet 1020.

The inner and outer magnets 1020 and 1030 may be spaced apart from the rear surface of the mirror 1011 by a certain distance, and may induce an electromagnetic force.

In some implementations, the MEMS scanner 1010 may be driven horizontally/vertically due to the electromagnetic force.

The MEMS scanner 1010 may be connected to a circuit board such as a flexible printed circuit board (FPCB) or a printed circuit board (PCB).

The mirror 1011 may rotate in a first direction and a second direction.

That is, the mirror 1011 may rotate in two directions, and may reflect light while rotating in the two directions. As such, the MEMS scanner 1010 may perform scanning operation in the vertical and horizontal directions.

Figure 11:
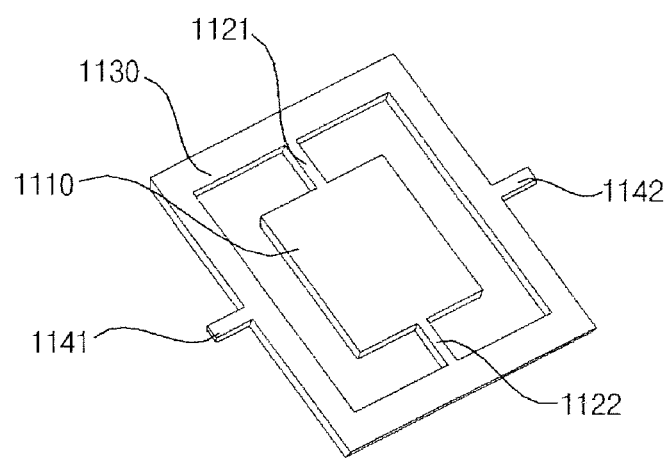
FIGS. 11 and 12 are reference views of an example MEMS scanner.
Figure 12:
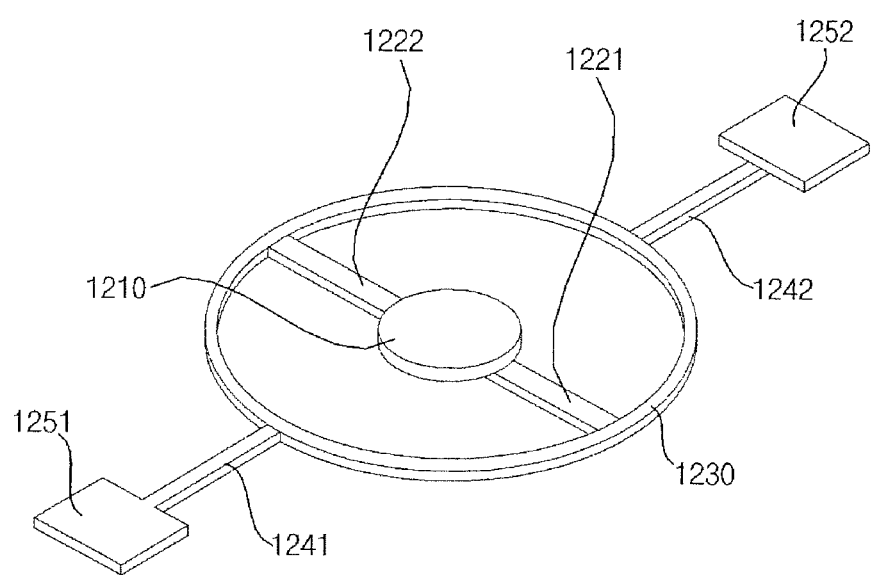

FIGS. 11 and 12 examples and operations of a MEMS scanner.

Referring to FIG. 11, the MEMS scanner may include a mirror 1110 for reflecting light, first elastic bodies 1121 and 1122 for rotating the mirror 1110 in a first direction, e.g., a horizontal direction, second elastic bodies 1141 and 1142 for rotating the mirror 1110 in a second direction, e.g., a vertical direction, and a gimbal 1130 for distinguishing between vertical direction rotation and horizontal direction rotation of the mirror 1110.

Each of the second elastic bodies 1141 and 1142 may be connected to and supported by a supporting part.

The mirror 1110 may rotate in the vertical and horizontal directions due to the first elastic bodies 1121 and 1122 and the second elastic bodies 1141 and 1142 to project incident light to the outside to be scanned in the horizontal and vertical directions.

If a current is applied to a mirror, a magnetic field is generated due to a magnetic substance, and a MEMS scanner using an electromagnetic force may be driven based on a Lorentz force generated due to the magnetic field.

The mirror 1110 may rotate in the first and second directions, and a circular frequency of the first direction may differ from that of the second direction.

The mirror 1110 may have a rectangular shape.

For example, as illustrated in FIG. 12, the mirror 1210 may have a circular shape.

Referring to FIG. 12, the MEMS scanner may include a mirror 1210 for reflecting light, first elastic bodies 1221 and 1222 for rotating the mirror 1210 in a first direction, e.g., a horizontal direction, second elastic bodies 1241 and 1242 for rotating the mirror 1210 in a second direction, e.g., a vertical direction, a gimbal 1230 for distinguishing between vertical direction rotation and horizontal direction rotation of the mirror 1210, and supporting parts 1251 and 1252 connected to the second elastic bodies 1241 and 1242.

Figures 13A, 13B:
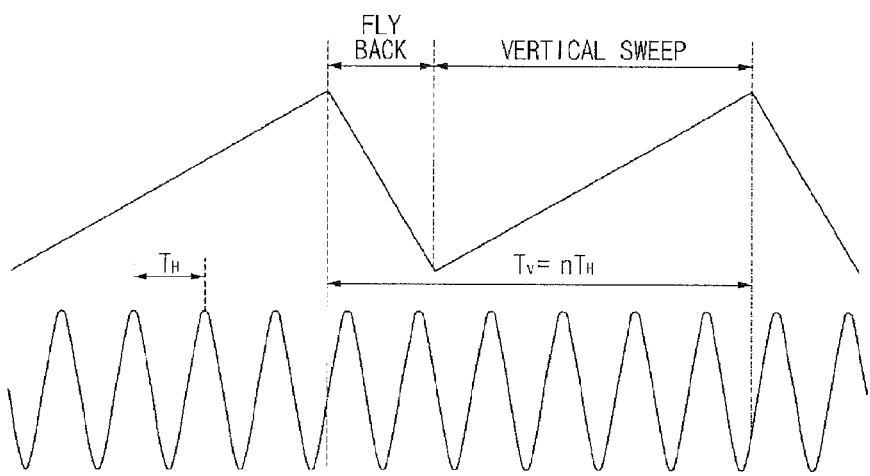
FIGS. 13(a) and 13(b) are views of example driving signal waveforms of a scanner.
Figure 14:
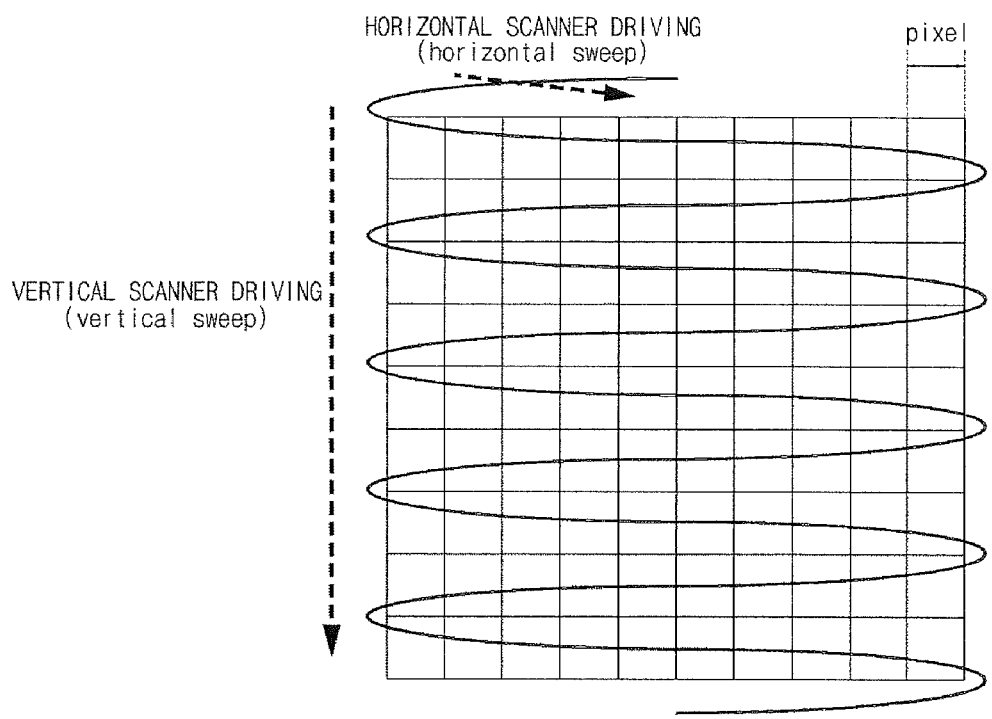
FIG. 14 is a view of example horizontal driving and vertical driving of a scanner based on the driving signal waveforms of FIG. 13.

FIG. 13 illustrates example driving signal waveforms of a scanner, and FIG. 14 illustrates example horizontal driving and vertical driving of the scanner.

Referring to FIGS. 13 and 14, the scanner may sweep horizontally and vertically based on the driving signal waveform, perform scanning from an initial position to a final position, and repeat scanning from the initial position.

Referring to FIGS. 13 and 14, the scanner may be vertically driven based on a ramp waveform, e.g., a sawtooth waveform, and horizontally driven based on a sinusoidal waveform.

FIG. 13 (a) shows a vertical sawtooth waveform having a vertical cycle $T_V$, and FIG. 13 (b) shows a horizontal sinusoidal waveform having a horizontal cycle $T_H$.

For example, the scanner may linearly sweep in the vertical direction during scanning operation along the vertical sawtooth waveform having the vertical cycle $T_V$.

The scanner may sweep in the vertical direction, e.g., from above to below, during a vertical sweep period, return to an initial position during a fly-back period, and then newly start scanning.

In some implementations, the scanner may sweep in the horizontal direction at a sweep frequency $1/T_H$ during scanning operation based on the sinusoidal waveform having the horizontal cycle $T_H$.

The vertical sweep period may be a scanning period in which a light source is turned on to output a high beam, and the fly-back period may be a period in which the light source is turned off.

The scanner may perform scanning operation using a progressive scanning scheme for sequentially scanning lines of a scan area as described above for a certain time.

That is, the progressive scanning scheme is a scheme for alternately scanning odd-numbered lines and even-numbered lines among all lines of a scan area. For example, the odd-numbered lines may be scanned from the left to the right, and the even-numbered lines may be scanned from the right to the left. In some implementations, the odd-numbered lines may be scanned from the right to the left, and the even-numbered lines may be scanned from the left to the right.

Figure 15:
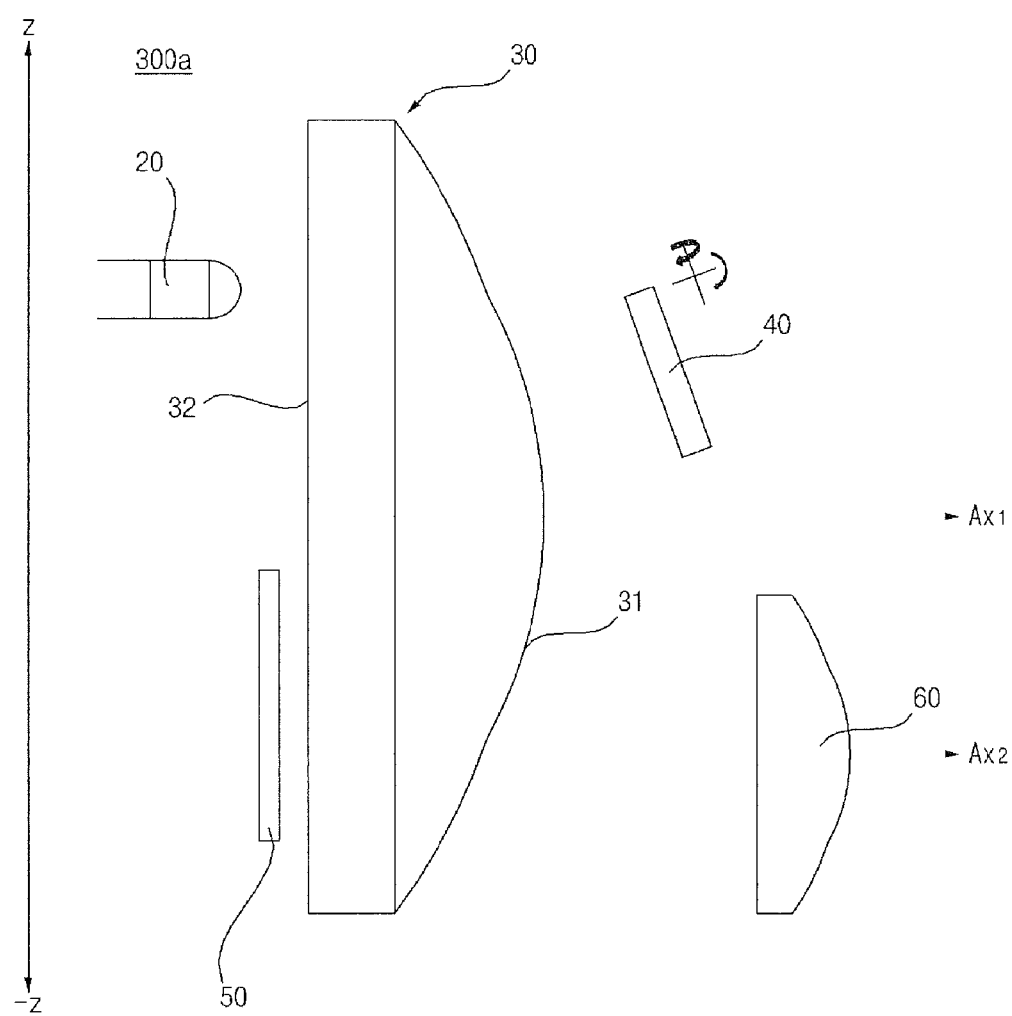
FIG. 15 is a conceptual view of an example light-emitting module.
Figure 16:
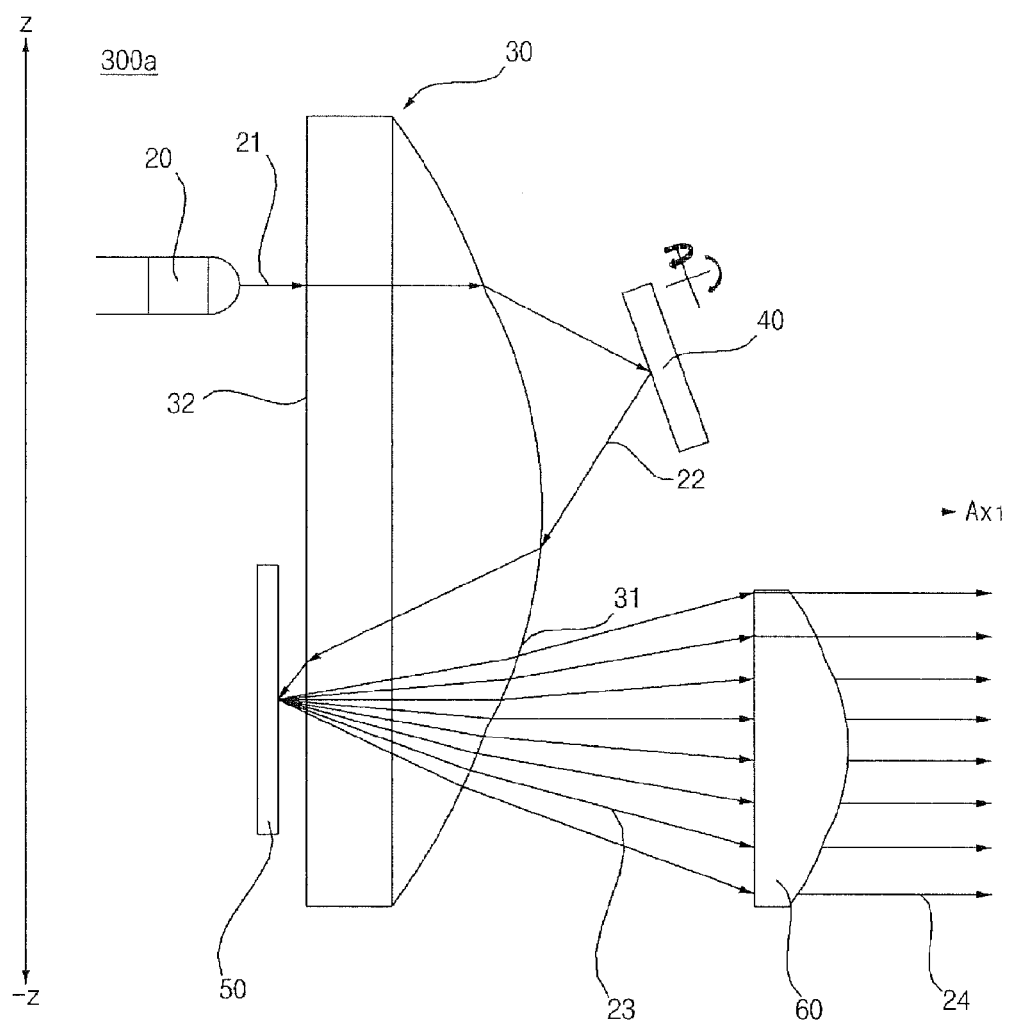
FIG. 16 is a conceptual view of a path of light output from an example light-emitting module.

FIG. 15 illustrates an example light-emitting module 300a. FIG. 16 illustrates light output from an example light-emitting module 300a.

Referring to FIGS. 15 and 16, the light-emitting module 300a includes a condenser lens 30 for focusing light incident from a rear side onto a space of a front side, a laser light source 20 disposed at the rear of the condenser lens 30 to provide first light 21 toward the condenser lens 30, a MEMS scanner 40 disposed in front of the condenser lens 30 to provide first reflected light 22 toward the condenser lens 30 by scanning the first light 21 in a horizontal direction and a vertical direction, and a reflection unit 50 disposed at the rear of the condenser lens 30 to provide second reflected light toward the condenser lens 30 by reflecting the first reflected light 22.

Herein, based on FIG. 15, the direction "front" refers to a right side of a central axis (or optical axis) $Ax_1$ of the condenser lens 30, and the direction "rear" refers to a left side of the central axis $Ax_1$ of the condenser lens 30.

In some implementations, the central axis $Ax_1$ of the condenser lens 30 is a virtual line which interconnects a focal point of a front surface 31 of the condenser lens 30 and the center of the condenser lens 30.

The condenser lens 30 focuses light incident from a rear side of the optical axis onto a space of a front side of the optical axis. The condenser lens 30 refracts the incident light due to the shape of the condenser lens 30 and the difference in refractive index between the condenser lens 30 and the outside. The refractive index of the condenser lens 30 may be greater than 1 and, more particularly, may be 1.5 to 1.6.

For example, the condenser lens 30 includes a spherical lens or an aspherical lens. In some implementations, the condenser lens 30 is implemented as an aspherical lens.

The condenser lens 30 may have a convex shape toward the front side of the optical axis $Ax_1$. As another example, the condenser lens 30 may include a rear surface 32 perpendicular to the central axis $Ax_1$ of the condenser lens 30, and the front surface 31 convex toward the front side of the condenser lens 30. In some implementations, the rear surface 32 may have a concave shape toward the front side of the optical axis.

The front surface 31 of the condenser lens 30 is a curved surface having a peak on the central axis $Ax_1$ of the condenser lens 30. In some implementations, the front surface 31 of the condenser lens 30 may be a curved surface having a focal point on the central axis $Ax_1$ of the condenser lens 30 and having multiple radii of curvature.

The condenser lens 30 refracts light which is incident in parallel to the central axis $Ax_1$ of the condenser lens 30, and focuses the light onto an arbitrary location of the front side of the optical axis. The condenser lens 30 may be formed of various materials capable of transmitting light.

The laser light source 20 receives electrical energy, converts the electrical energy into light energy, and thus generates light. In some implementations, the laser light source 20 is implemented as a laser diode (LD) having good directionality and convergence of light.

The laser light source 20 may receive power supplied from a variety of power source devices. In some implementations, the laser light source 20 may receive power supplied from a printed circuit board (PCB), a metal core PCB, a flexible PCB, a ceramic PCB, br the like.

Herein, the laser diode is a semiconductor laser having two electrodes for performing laser operation. In some implementations, the laser diode may have a GaAs/Alx Ga1-xAs-based double heterojunction structure.

The laser light source 20 may generate various colors of light. In some implementations, the laser light source 20 generates blue light having good optical efficiency.

The laser light source 20 is disposed at the rear of the condenser lens 30 and provides the first light 21 toward the condenser lens 30. The first light 21 is incident in parallel to the central axis (optical axis) $Ax_1$ of the condenser lens 30. Herein, the term "parallel" does not refer to a mathematically parallel state but refers to a substantially parallel state within an allowable range.

The first light 21 may be incident on the rear surface 32 which is eccentric from the central axis $Ax_1$ of the condenser lens 30.

In some implementations, the condenser lens 30 may be divided into a first area and a second area based on the central axis $Ax_1$ of the condenser lens 30 on a cross section penetrating the central axis $Ax_1$.

For example, as shown in FIG. 15, the first area is an upper area (e.g., Z direction area) based on the central axis $Ax_1$ of the condenser lens 30. The second area is a lower area (e.g., −Z direction area) based on the central axis $Ax_1$ of the condenser lens 30. In some implementations, the first light 21 is incident on the first area of the condenser lens 30.

To this end, the laser light source 20 is located eccentrically from the central axis $Ax_1$ of the condenser lens 30. The laser light source 20 is spaced apart from the central axis $Ax_1$ of the condenser lens 30 in a first direction (e.g., Z direction) perpendicular to the central axis $Ax_1$ of the condenser lens 30. The laser light source 20 and the reflection unit 50 are disposed to face each other based on the central axis $Ax_1$ of the condenser lens 30.

The first light 21 generated by the laser light source is incident on a location which is eccentric from the central axis $Ax_1$ of the condenser lens 30, is refracted through the front surface 31 of the condenser lens 30, and then is incident on the MEMS scanner 40.

The MEMS scanner 40 is disposed in front of the condenser lens 30, reflects the first light 21 having passed through the condenser lens 30, and provides the first reflected light 22 toward the condenser lens 30.

The MEMS scanner 40 is disposed in such a manner that the first reflected light 22 is incident on the front surface 31 of the condenser lens 30 and then is emitted from the rear surface 32 of the condenser lens 30.

The MEMS scanner 40 is rotatably implemented to adjust the angle of the first reflected light 22.

In some implementations, the MEMS scanner 40 may perform scanning operation in horizontal and vertical directions under control of the scanner driving unit 250 (see FIG. 7).

In some implementations, to efficiently provide components within a limited space of an in-vehicle lamp and to increase the efficiency thereof, the MEMS scanner 40 may be disposed in such a manner that the first reflected light 22 is incident on the front surface 31 which is eccentric from the central axis $Ax_1$ of the condenser lens 30. In some implementations, the first reflected light 22 is incident on the second area of the condenser lens 30.

A spot of the front surface 31 of the condenser lens 30, on which the first reflected light 22 is incident, is spaced apart from the central axis $Ax_1$ of the condenser lens 30 in a second direction. That is, the first reflected light 22 is incident on another area of the condenser lens 30, which is symmetrical to the area of the condenser lens 30 on which the first light 21 is incident.

If the MEMS scanner 40 is disposed on the central axis $Ax_1$ of the condenser lens 30, the distance between the MEMS scanner 40 and the light source is increased and thus the length of the light-emitting module 300a is also increased. In some implementations, the MEMS scanner 40 is spaced apart from the central axis $Ax_1$ of the condenser lens 30 in the first direction (e.g., Z direction) perpendicular to the central axis $Ax_1$ of the condenser lens 30.

For example, the MEMS scanner 40 includes the mirror 1011 (see FIG. 10) having a reflective surface crossing the optical axis. Herein, the reflective surface may be formed of a material having good reflection characteristics, e.g., a material selected from the group consisting of silver (Ag), nickel (Ni), aluminum (Al), rhodium (Rh), palladium (Pd), iridium (Ir), ruthenium (Ru), magnesium (Mg), zinc (Zn), platinum (Pt), gold (Au), hafnium (Hf), and a combination thereof.

The reflective surface may have a structure in which multiple layers having different refractive indexes are alternately stacked on one another.

The reflection unit 50 is disposed at the rear of the condenser lens 30, reflects the first reflected light 22, and provides the second reflected light 23 toward the condenser lens 30.

The reflection unit 50 may serve only to reflect light, or to reflect light and convert a wavelength thereof. For example, the reflection unit 50 may convert the wavelength of blue light generated by the laser light source 20, to white light. A detailed description of the configuration of the reflection unit 50 will be given below. That is, the reflection unit 50 may serve only to reflect light, or to reflect light and convert a wavelength thereof depending on use of the light-emitting module 300a. Accordingly, the second reflected light 23 reflected from the reflection unit 50 may have a wavelength different from that of the first reflected light 22.

The reflection unit 50 is disposed at the rear of the condenser lens 30 and provides the second reflected light 23 toward the condenser lens 30.

The first reflected light 22, which is incident on the front surface 31 of the condenser lens 30 from the MEMS scanner 40, is refracted through the surface of the condenser lens 30 and is emitted from the rear surface 32 of the second area of the condenser lens 30. The first reflected light 22 having passed through the condenser lens 30 is incident on the reflection unit 50 and is emitted as the second reflected light 23 from the reflection unit 50. The second reflected light 23 is incident on the rear surface 32 which is eccentric from the central axis $Ax_1$ of the condenser lens 30. In some implementations, the second reflected light 23 is incident on the second area of the rear surface 32 of the condenser lens 30.

A description is now given of reflection characteristics of light.

Light may be specular-reflected or diffuse-reflected depending on the surface properties of a reflector.

Diffuse reflection may include Gaussian reflection, Lambertian reflection, and mixed reflection.

In general, specular reflection refers to reflection in which, when light is incident on a point of the reflector, an angle between the normal passing the point and an optical axis of the incident light is equal to an angle between the normal and an optical axis of reflected light.

Gaussian reflection refers to reflection in which the intensity of reflected light based on an angle of the surface of a reflector and an angle between the normal and the reflected light vary to values of a Gaussian function.

Lambertian reflection refers to reflection in which the intensity of reflected light based on an angle of the surface of a reflector and an angle between the normal and the reflected light vary to values of a cosine function.

Mixed reflection refers to reflection including at least two of specular reflection, Gaussian reflection, and Lambertian reflection.

In some implementations, the MEMS scanner 40 is driven vertically and horizontally and specular-reflects light to scan the light. If the reflection unit 50 serves only to reflect light, the reflection unit 50 specular-reflects the light.

In some implementations, if the reflection unit 50 serves to reflect light and convert a wavelength thereof, the reflection unit 50 has a structure including a reflection layer and a phosphor layer coated on the reflection layer. When the reflection unit 50 serves to reflect light and convert a wavelength thereof, the second reflected light 23 provided from the reflection unit 50 may be Lambertian-reflected or mixed-reflected light. Accordingly, when the reflection unit 50 serves to reflect light and convert a wavelength thereof, the second reflected light 23 may be emitted toward a front side of the optical axis Ax. That is, the second reflected light 23 has a fan shape having a certain angle above and below an arbitrary line parallel to the central axis $Ax_1$ of the condenser lens 30.

In some implementations, a reflective surface of the reflection unit 50 is provided to be perpendicular to the central axis $Ax_1$ of the condenser lens 30.

The second reflected light 23 is incident on the first area of the rear surface 32 of the condenser lens 30, is refracted at an interface of the condenser lens 30, and then is emitted from the condenser lens 30. The second reflected light 23 having passed through the condenser lens 30 has a radiation angle smaller than that of the second reflected light 23 which is incident on the condenser lens 30.

Accordingly, the second reflected light 23 having passed through the condenser lens 30 is diffused with a certain degree of directionality. Such second reflected light 23 may be used as a low beam which is projected from the in-vehicle lamp to a short-distance area.

The reflection unit 50 is spaced apart from the central axis $Ax_1$ of the condenser lens 30 in a second direction (e.g., −Z direction) perpendicular to the central axis $Ax_1$ of the condenser lens 30. The reflection unit 50 and the laser light source 20 are disposed to face each other based on the central axis $Ax_1$ of the condenser lens 30.

In some implementations, the second reflected light 23 may be converted into light which is substantially parallel to the optical axis and thus may be used as a high beam which is projected to a long-distance area. Thus, the light-emitting module 300a may further include an auxiliary condenser lens 60 for focusing the second reflected light 23 having passed through the condenser lens 30, in a front direction.

The auxiliary condenser lens 60 focuses light incident from the rear side of the optical axis on a space of the front side of the optical axis. The auxiliary condenser lens 60 refracts the incident light due to the shape of the auxiliary condenser lens 60 and the difference in refractive index between the auxiliary condenser lens 60 and the outside. The refractive index of the auxiliary condenser lens 60 may be greater than 1 and, more particularly, may be 1.5 to 1.6.

For example, the auxiliary condenser lens 60 includes a spherical lens or an aspherical lens. In some implementations, the auxiliary condenser lens 60 is implemented as an aspherical lens.

The auxiliary condenser lens 60 may have a convex shape toward the front side of the optical axis $Ax_1$. As another example, the auxiliary condenser lens 60 may include a rear surface perpendicular to a central axis Axe of the auxiliary condenser lens 60, and a front surface convex toward a front side of the auxiliary condenser lens 60. In some implementations, the rear surface may have a concave shape toward the front side of the optical axis.

The central axis Axe of the auxiliary condenser lens 60 is located eccentrically from the central axis $Ax_1$ of the condenser lens 30. In some implementations, the central axis $Ax_2$ of the auxiliary condenser lens 60 may be located within the second area of the condenser lens 30. In some implementations, the central axis $Ax_2$ of the auxiliary condenser lens 60 horizontally overlaps with the central axis $Ax_1$ of the condenser lens 30. In some implementations, the central axis $Ax_2$ of the auxiliary condenser lens 60 is parallel to the central axis $Ax_1$ of the condenser lens 30.

The light incident on the auxiliary condenser lens 60 from a rear side thereof is refracted at an interface of the auxiliary condenser lens 60 and then is emitted as light parallel to the optical axis.

The light having wavelength-converted and reflected by the reflection unit 50 is incident similarly to light incident from a focal point of the auxiliary condenser lens 60, and is efficiently converted into light parallel to the optical axis. The auxiliary condenser lens 60 may be formed of the same material as the condenser lens 30.

Figure 17:
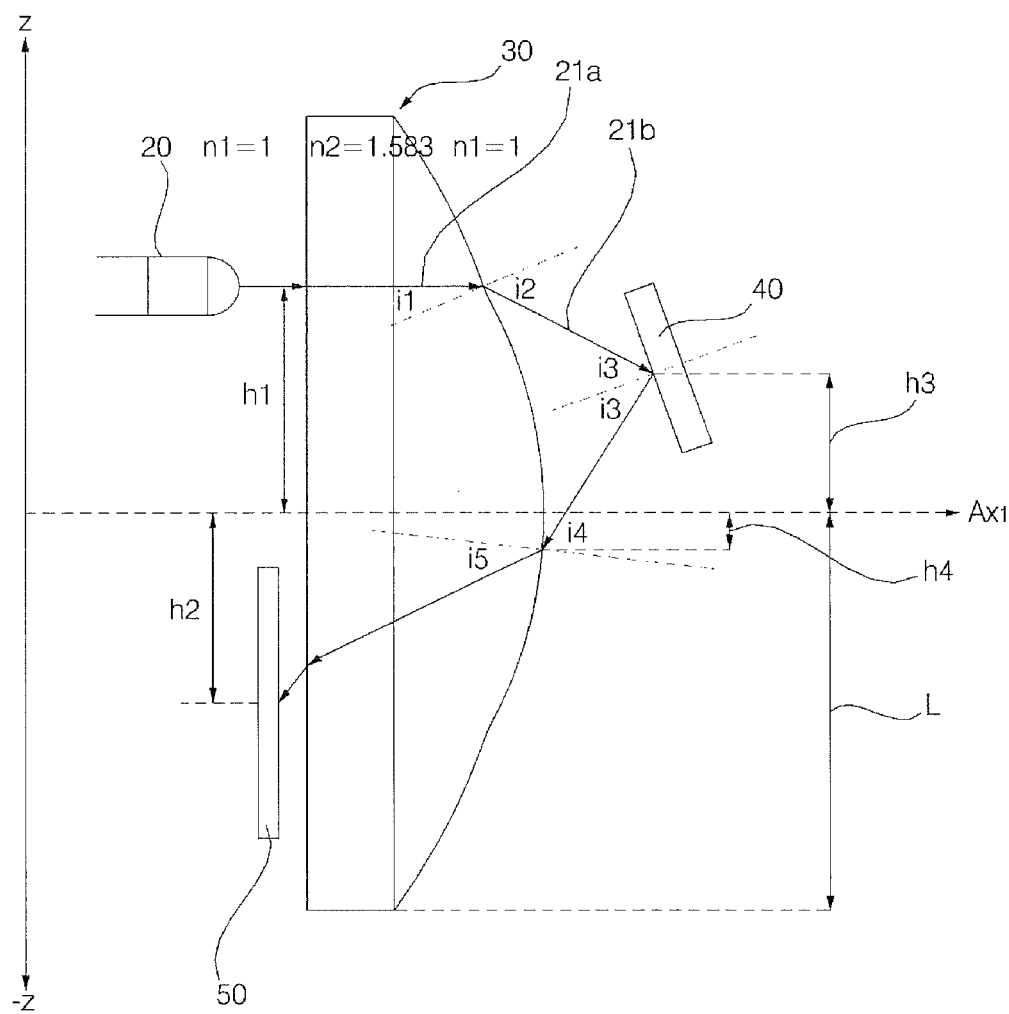
FIGS. 17 and 18 are reference views of refraction and reflection of light output from an example light-emitting module.
Figure 18:
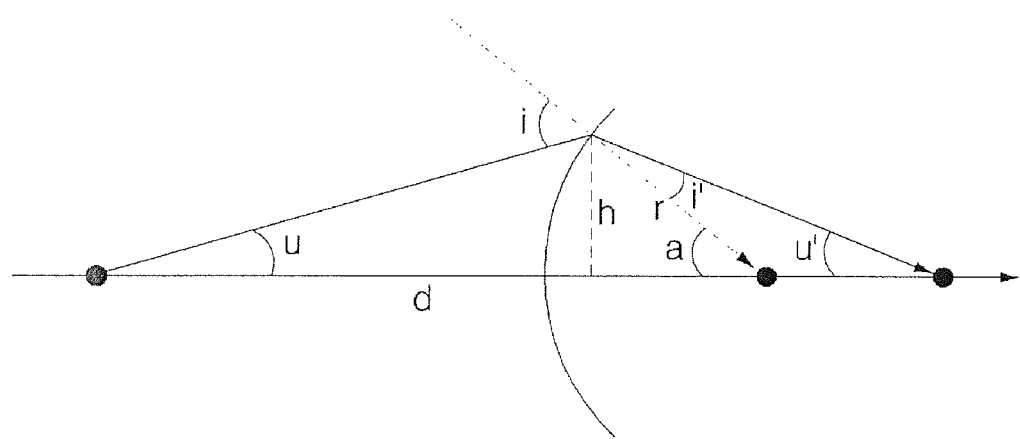

FIGS. 17 and 18 illustrate refraction and reflection of light output from an example light-emitting module 300a.

Referring to FIG. 18, Snell's law related to refraction of light is as given below.

$$n \sin i = n' \sin i'$$

A refraction formula is obtained by transforming Snell's law as given below.

$$ni \cong n'i'$$
$$n(\alpha - u) = n'(\alpha - u')$$
$$n\left(\frac{h}{r} - u\right) = n'\left(\frac{h}{r} - u'\right)$$
$$n'u' = nu + \frac{h}{r}(n' - n)$$

Herein, n refers to a refractive index of a medium before refraction, n' refers to a refractive index of the medium after refraction, i refers to an angle between an incident surface of light and a vertical plane, and i' refers to an angle between emitted light and the vertical plane.

Using the above refraction formula, a distance h from the central axis $Ax_1$ of the condenser lens 30 to each component may be calculated as given below.

$$n'u' = nu + \frac{h}{r}(n' - n) \Rightarrow h = \frac{r(n'u' - nu)}{(n' - n)}$$

Herein, r refers to a radius of curvature of a lens.

The condenser lens 30 may be an aspherical lens, a central part of which has a radius of curvature smaller than that of an edge part.

The laser light source 20, the MEMS scanner 40, and the reflection unit 50 overlap with the condenser lens 30 when viewed from the front side of the central axis $Ax_1$ of the condenser lens 30. Accordingly, a housing accommodating the light-emitting module 300a may be reduced to the size of the condenser lens 30.

In some implementations, a first distance h1 between the central axis $Ax_1$ of the condenser lens 30 and the laser light source 20 is smaller than a radius L of the condenser lens 30. Herein, the first distance h1 is calculated using the above-described distance calculation formula.

In some implementations, a second distance h2 between the central axis $Ax_1$ of the condenser lens 30 and the reflection unit 50 is smaller than the radius L of the condenser lens 30. The second distance h2 is also calculated using the above-described distance calculation formula. The reflection unit 50 is disposed at the rear of the condenser lens 30 and, more particularly, near the rear surface 32 of the condenser lens 30.

In some implementations, the first distance h1 of the laser light source 20 may equal the second distance h2 of the reflection unit 50. In some implementations, a ratio of the first distance h1 to the second distance h2 may be 1:0.7 to 1:1.1. In some implementations, the ratio of the first distance h1 to the second distance h2 may be 1:0.94 to 1:0.98.

A third distance h3 between the central axis $Ax_1$ of the condenser lens 30 and the MEMS scanner 40 is smaller than the radius L of the condenser lens 30 and is greater than 0. The third distance h3 is also calculated using the above-described distance calculation formula.

A fourth distance h4 between the central axis $Ax_1$ of the condenser lens 30 and an incident spot of the first reflected light 22 may be smaller than the first distance h1 or the second distance h2. In some implementations, a ratio of the first distance h1 of the laser light source 20 to the fourth distance h4 of the incident spot may be 1:0.1 to 1:0.6. In some implementations, the ratio of the first distance h1 of the laser light source 20 to the fourth distance h4 of the incident spot may be 1:0.35 to 1:0.37.

For convenience of assembly, the light-emitting module 300a is generally accommodated in a hexahedral housing. Accordingly, by disposing the laser light source 20 at an upper rear side of the condenser lens 30 and disposing the reflection unit 50 at a lower rear side of the condenser lens 30, the length of the light-emitting module 300a may be reduced, use of space may be maximized, and thus the light-emitting module 300a may be accommodated in the housing.

In some implementations, by disposing the auxiliary condenser lens 60 at a lower front side of the condenser lens 30 and disposing the MEMS scanner 40 at an upper front side of the condenser lens 30, the length of the light-emitting module 300a may be reduced, use of space may be maximized, and thus the light-emitting module 300a may be accommodated in the housing.

Figure 19A:
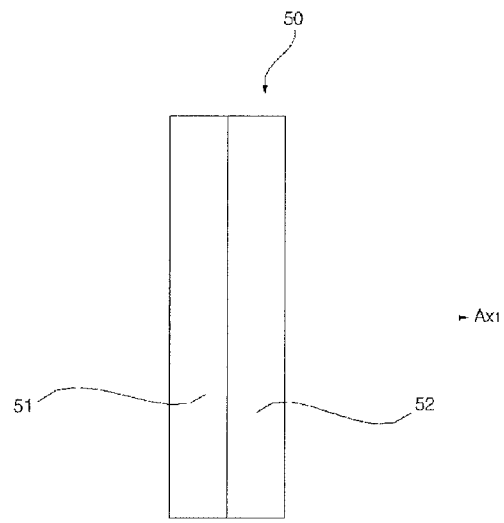
FIGS. 19(a) and 19(b) are cross-sectional views of example reflection units.
Figure 19B:
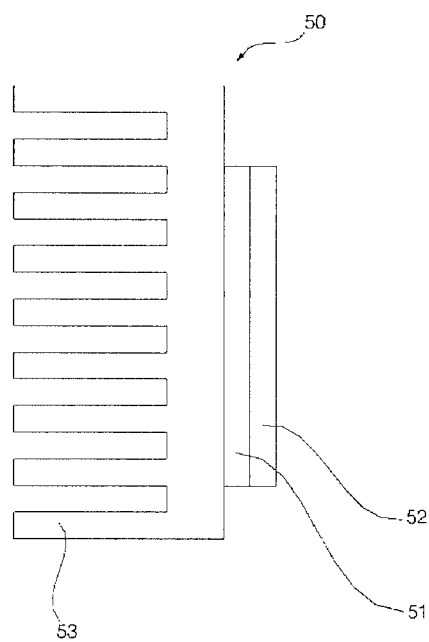

FIGS. 19(a) and 19(b) illustrate example reflection units 50.

Referring to FIG. 19(a), the reflection unit 50 includes a wavelength conversion layer 52 for converting a wavelength of incident light, and a reflection layer 51 for reflecting the incident light.

An interface of the reflection layer 51 is provided to be perpendicular to the optical axis $Ax_1$. The reflection layer 51 may be formed of a material having good reflection characteristics, e.g., a material selected from the group consisting of Ag, Ni, Al, Rh, Pd, Ir, Ru, Mg, Zn, Pt, Au, Hf, and a combination thereof.

The wavelength conversion layer 52 converts the wavelength of the incident light. In some implementations, blue light is incident on the wavelength conversion layer 52 and is converted into white light.

The wavelength conversion layer 52 is located in front of the reflection layer 51. Accordingly, the incident first reflected light 22 is wavelength-converted by the wavelength conversion layer 52, and is reflected by the reflection layer to be converted into the second reflected light 23 proceeding toward the condenser lens 30.

For example, the wavelength conversion layer 52 may have a structure in which a phosphor is dispersed in a base layer, e.g., transparent silicone. The phosphor is selected depending on the wavelength of light emitted from the laser light source 20, in such a manner that the light-emitting module 300a emits white light.

Depending on the wavelength of the light emitted from the laser light source 20, the phosphor may include one of a blue light-emitting phosphor, a blue-green light-emitting phosphor, a green light-emitting phosphor, a yellow-green light-emitting phosphor, a yellow light-emitting phosphor, a yellow-red light-emitting phosphor, an orange light-emitting phosphor, and a red light-emitting phosphor.

In some implementations, if the laser light source 20 is a blue laser diode and the phosphor is a yellow phosphor, the yellow phosphor may be excited by blue light and emit yellow light. The blue light generated by the blue laser diode and the yellow light excited by the blue light may be mixed and thus the light-emitting module 300a may provide white light.

As another example, the wavelength conversion layer 52 may be implemented as a coating layer or a film layer. In some implementations, the wavelength conversion layer 52 may include a yellow opto-ceramic which has excellent thermal stability compared to conventional phosphors.

As another example, as shown in FIG. 19(b), a heat sink 53 may be coupled to a surface of the reflection layer 51 of the reflection unit 50. The heat sink 53 dissipates heat generated from the reflection unit 50, thereby improving thermal stability of the reflection unit 50.

FIGS. 20 to 24 illustrate an example light-emitting module and scanning operation.

Figure 20:
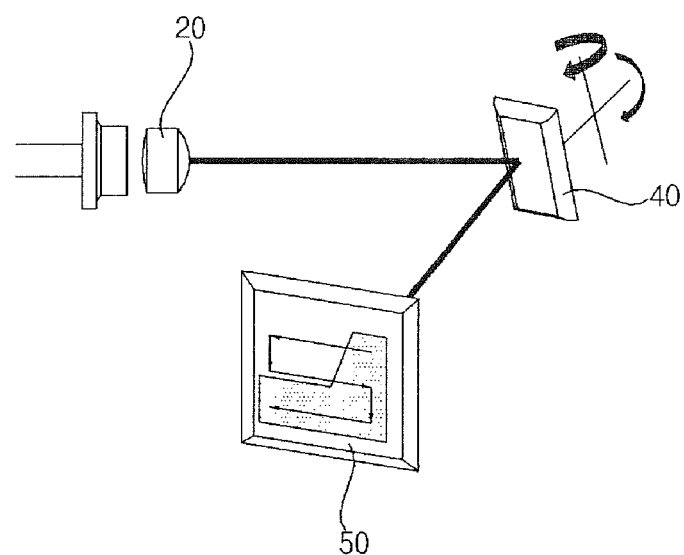
FIGS. 20 to 24(b) are reference views of example light-emitting modules and scanning operations.

FIG. 20 illustrates elements related to the scanning operation.

Referring to FIG. 20, in the light-emitting module, light incident from the laser light source 20 is scanned by the MEMS scanner 40 in horizontal and vertical directions.

The reflection unit 50 may reflect the scanned light in such a manner that the light is output and scanned to the outside.

Figure 21:
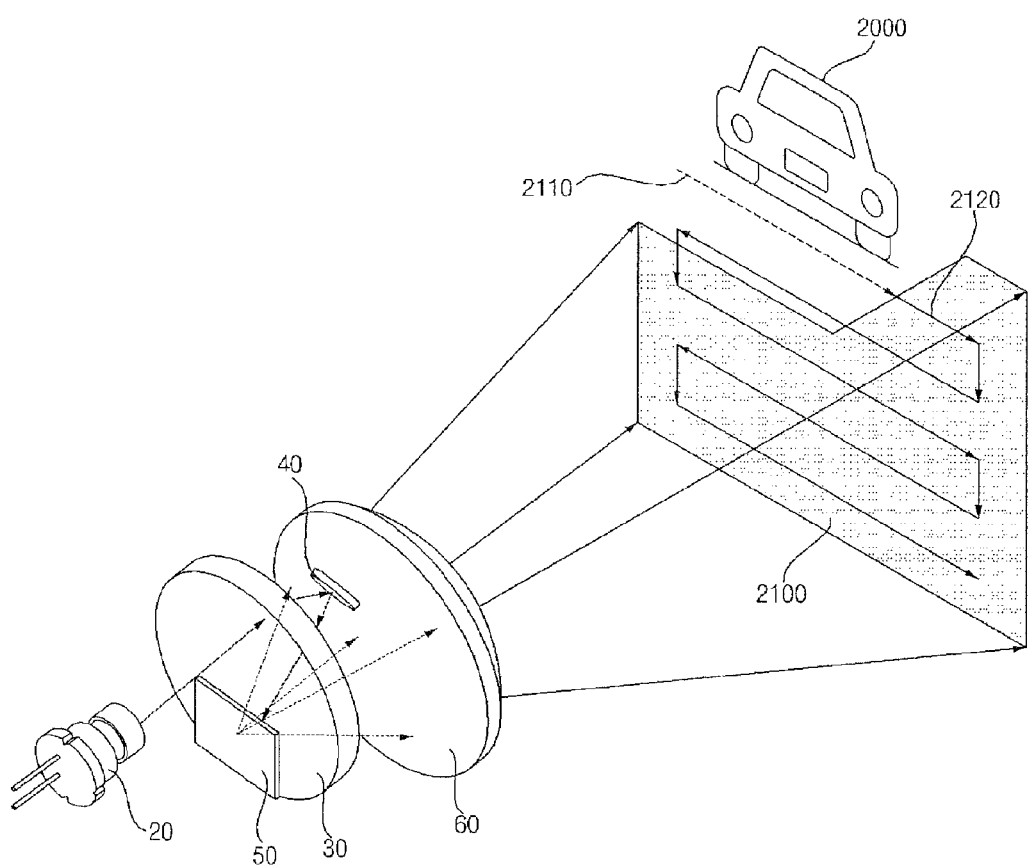

Referring to FIG. 21, the light-emitting module may include the condenser lens 30 for focusing light incident from a rear side of an optical axis, onto a space of a front side of the optical axis, the laser light source 20 disposed at the rear of the condenser lens 30 to provide first light toward the condenser lens 30, the MEMS scanner 40 disposed in front of the condenser lens 30 to provide first reflected light toward the condenser lens 30 by scanning the first light in a horizontal direction and a vertical direction, and the reflection unit 50 disposed at the rear of the condenser lens 30 to provide second reflected light toward the condenser lens 30 by reflecting the first reflected light.

In some implementations, the light-emitting module may further include the auxiliary condenser lens 60 for focusing the second reflected light having passed through the condenser lens 30, in a front direction.

The light-emitting module may be included in a headlamp for vehicles, and may be the first light-emitting module 300a described above in relation to FIG. 7, etc.

The headlamp may further include the interface unit 280 (see FIG. 7) for receiving oncoming vehicle detection information acquired by detecting an oncoming vehicle driving in the opposite lane, and the processor 270 (see FIG. 7) for generating a control signal for switching on and off states of the laser light source 20, based on the oncoming vehicle detection information.

Herein, the oncoming vehicle detection information may be information generated by the driver assistance apparatus 100 including the camera 195, based on a vehicle front image or a vehicle peripheral image obtained by the camera 195, as described above in relation to FIGS. 5 and 6.

The light-emitting module of the headlamp may further include the light source driving unit 260a (FIG. 7) for controlling on and off timings of the laser light source 20 based on a certain control signal.

In some implementations, the light-emitting module of the headlamp may further include the scanner driving unit 250 (see FIG. 7) for controlling horizontal direction scanning operation and vertical direction scanning operation of the MEMS scanner 40. In some implementations, the scanner driving unit 250 may drive the horizontal direction scanning operation based on a sinusoidal waveform, and drive the vertical direction scanning operation based on a sawtooth waveform, as described above in relation to FIGS. 13 and 14.

Light incident from the laser light source 20 may be scanned by the MEMS scanner 40 in horizontal and vertical scanning directions, and the scanned light may be reflected and output to the outside by the reflection unit 50.

As such, as illustrated in FIG. 20, the light may be output to an external scan area 2100 and may be scanned downward sequentially from the left (or right) to the right (or left) and then to the left (or right).

If the laser light source 20 of the light-emitting module 300a is turned on and light passes through optical components and then is scanned and output to the outside, a front side of the vehicle 700 is brightened due to the light output from the light-emitting module 300a.

The driver assistance apparatus 100 may detect an oncoming vehicle 2000 driving in the opposite lane. The driver assistance apparatus 100 may transmit oncoming vehicle detection information to the processor 270 of the in-vehicle lamp 200. The oncoming vehicle detection information may be transmitted to the processor 270 of the in-vehicle lamp 200 directly or via the controller 770.

The oncoming vehicle detection information may include location information of the oncoming vehicle 2000, and relative distance information and relative speed information between the vehicle 700 and the oncoming vehicle 2000.

The processor 270 may generate a control signal for switching on and off states of the laser light source 20, based on the oncoming vehicle detection information.

In some implementations, the light source driving unit 260a may control the on or off state of the laser light source 20 based on the control signal of the processor 270.

Referring to FIG. 21, the laser light source 20 may be turned off in a scanning period 2110 in which light is directed to the oncoming vehicle 2000, and may be turned on in a scanning period 2120 in which light is not directed to the oncoming vehicle 2000.

Accordingly, since light is not projected toward a driver of the oncoming vehicle 2000, glare may be prevented.

Figure 22A:
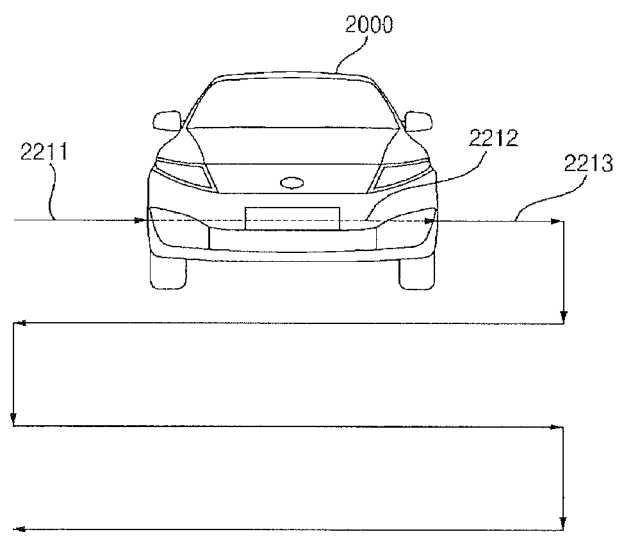
Figure 22B:
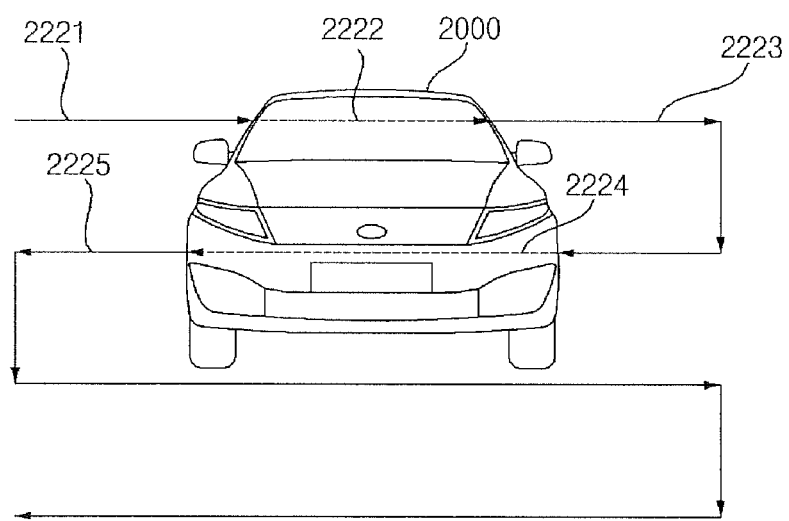
Figure 22C:
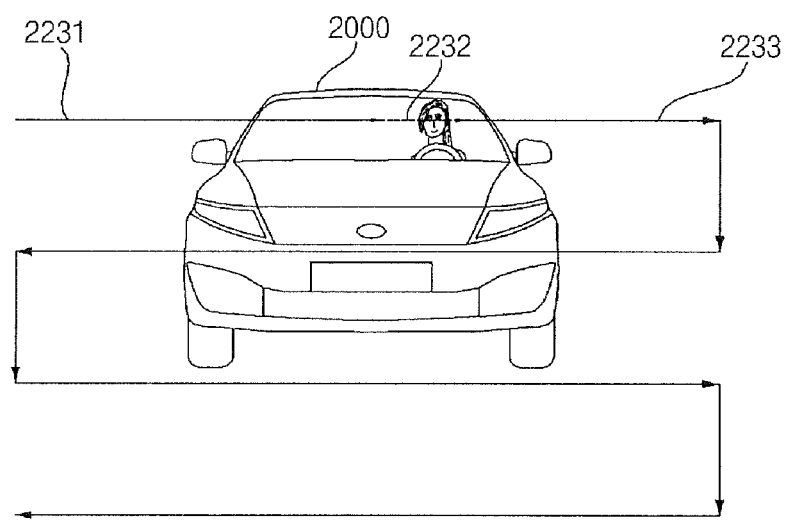

FIGS. 22(*a*) to 22(*c*) are schematic diagrams showing examples of high beam scanning of the in-vehicle lamp 200.

Referring to FIG. 22(*a*), if the oncoming vehicle 2000 is detected, the laser light source 20 may be turned off in a period 2212 in which output light scans the oncoming vehicle 2000, and may be turned on in periods 2211 and 2213 prior and subsequent to the period 2212.

Although FIGS. 22(*a*) to 22(*c*) illustrate a few lines high-resolution scanning is enabled using the MEMS scanner 40. Accordingly, light may scan the oncoming vehicle 2000 in one or more periods.

Referring to FIG. 22(*b*), if the oncoming vehicle 2000 is detected, the laser light source 20 may be turned off in periods 2222 and 2224 in which output light scans the oncoming vehicle 2000, and may be turned on in periods 2221, 2223, and 2225 prior and subsequent to the periods 2222 and 2224.

In some implementations, if the driver assistance apparatus 100 is capable of detecting not only the oncoming vehicle 2000 but also a driver thereof, as illustrated in FIG. 22(*c*), the laser light source 20 may be turned off in a period 2232 in which output light scans the driver, and may be turned on in periods 2231 and 2233 prior and subsequent to the period 2232.

In some implementations, only one laser light source is included.

For example, the light-emitting module may include two or more laser light sources.

Figure 23:
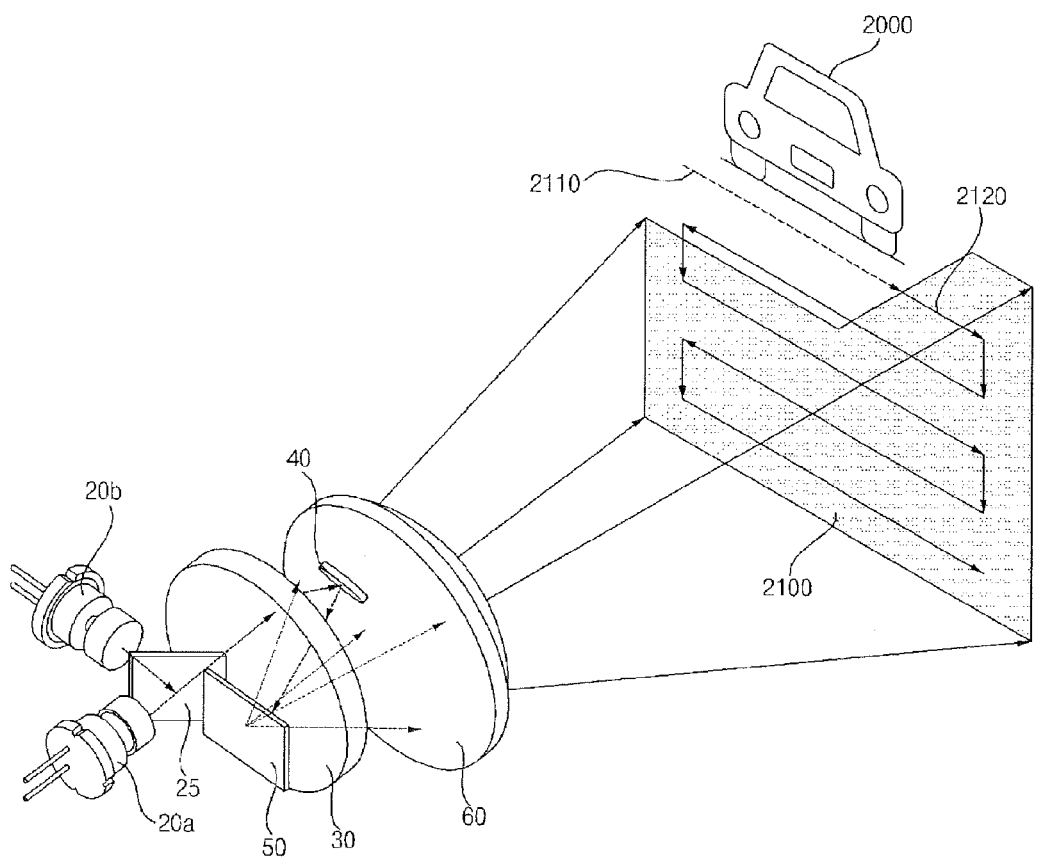

Referring to FIG. 23, the light-emitting module may include the condenser lens 30 for focusing light incident from a rear side of an optical axis, onto a space of a front side of the optical axis, laser light sources 20a and 20b disposed at the rear of the condenser lens 30 to provide first light toward the condenser lens 30, the MEMS scanner 40 disposed in front of the condenser lens 30 to provide first reflected light toward the condenser lens 30 by scanning the first light in a horizontal direction and a vertical direction, and the reflection unit 50 disposed at the rear of the condenser lens 30 to provide second reflected light toward the condenser lens 30 by reflecting the first reflected light.

In some implementations, the light-emitting module may further include a combination unit 25 for combining output light of the laser light sources 20a and 20b. The combination unit 25 is capable of reflect or transmit light per wavelength and may be implemented as, for example, a dichroic mirror.

Figure 24A:
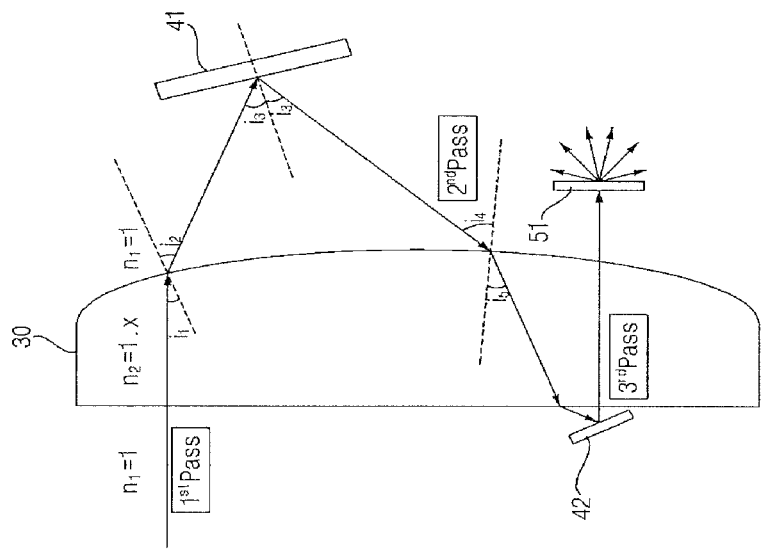
Figure 24B:
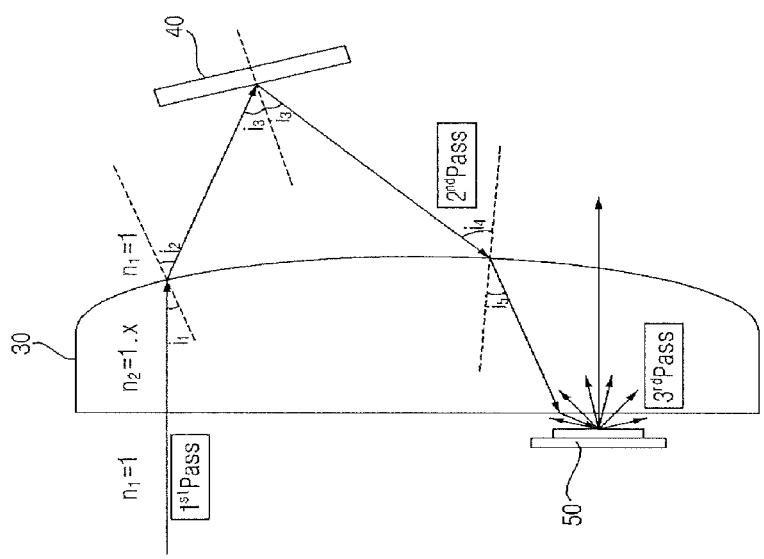

FIG. 24 illustrates an example light-emitting module.

Referring to FIG. 24(*a*), the light-emitting module may include the condenser lens 30 for focusing light incident from a rear side of an optical axis, onto a space of a front side of the optical axis, the MEMS scanner 40 for providing first reflected light toward the condenser lens 30 by scanning first light having passed through the condenser lens 30, in a horizontal direction and a vertical direction, and the reflection unit 50 disposed at the rear of the condenser lens 30 to provide second reflected light toward the condenser lens 30 by reflecting the first reflected light.

Referring to FIG. 24(*b*), the light-emitting module may include the condenser lens 30 for focusing light incident from a rear side of an optical axis, onto a space of a front side of the optical axis, a laser light source a disposed at the rear of the condenser lens 30 to provide first light toward the condenser lens 30, a reflection unit 41 disposed in front of the condenser lens 30 to provide first reflected light by reflecting the first light, a MEMS scanner 42 disposed at the rear of the condenser lens 30 to provide second reflected light toward the condenser lens 30 by scanning the first reflected light in a horizontal direction and a vertical direction, and a wavelength conversion unit 51 for converting the incident second reflected light into a different wavelength of light.

In some implementations, the wavelength conversion unit 51 may include a transmissive phosphor.

The light scanned by the MEMS scanner 42 may be converted into white light through the transmissive phosphor 51, and the converted white light may be emitted in a front direction.

The effects of a headlamp for vehicles and a vehicle including the same are as described below.

According to at least one implementation of the subject matter described in this specification, optimal-structure and ultra-high-resolution beam scanning may be implemented using a MEMS scanner.

According to at least one implementation of the subject matter described in this specification, by disposing a laser light source at an upper rear side of a condenser lens and disposing a reflection unit at a lower rear side of the condenser lens, the length of the light-emitting module may be reduced, use of space may be maximized, and thus the light-emitting module may be accommodated in a housing.

In addition, according to at least one implementation of the subject matter described in this specification, by disposing an auxiliary condenser lens at a lower front side of the condenser lens and disposing the reflection unit at an upper front side of the condenser lens, the length of the light-emitting module may be reduced, use of space may be maximized, and thus the light-emitting module may be accommodated in the housing.

Furthermore, according to at least one implementation of the subject matter described in this specification, since upper and lower areas of the condenser lens are separately used, the number of components may be reduced and a manufacturing cost may also be reduced.

Besides, according to at least one implementation of the subject matter described in this specification, since a reflective phosphor is used, the efficiency of light may be improved.

Additionally, according to at least one implementation of the subject matter described in this specification, light having excellent optical convergence and directionality may be provided using a structure.

Furthermore, according to at least one implementation of the subject matter described in this specification, by controlling output light based on the presence and location of an oncoming vehicle driving in the opposite lane, the road may be sufficiently illuminated without causing glare to a driver of the oncoming vehicle.

A variety of effects other than those described above are explicitly or implicitly disclosed in the detailed description.

In the drawings, parts irrelevant to description are omitted for clarity and brevity, and like reference numerals denote like components.

The terms "module" and "unit" used to signify components are used herein to help the understanding of the components and thus should not be construed as having specific meanings or functions. Accordingly, the terms "module" and "unit" may be used interchangeably.

A headlamp for vehicles and a vehicle including the same are not limited to the configurations and methods of the above-described implementations. However, the implementations may be variously changed or modified such that all or some of the implementations may be configured in combination.

What is claimed is:

1. A headlamp for at least one vehicle, the headlamp comprising a light-emitting module comprising:
    a condenser lens that defines an optical axis through a center of the condenser lens and that is configured to focus light incident on a rear surface of the condenser lens;
    a laser light source that is located behind the condenser lens and that is configured to generate light toward the condenser lens;
    a microelectromechanical system (MEMS) scanner that is located in front of the condenser lens, that is configured to reflect, toward the condenser lens, light generated by the laser light source, and that is configured to scan light generated by the laser light source by moving horizontally and vertically; and
    a reflection unit that is located behind the condenser lens and that is configured to reflect, toward the condenser lens, light reflected by the MEMS scanner.

2. The headlamp according to claim 1, further comprising:
    an interface unit that is configured to receive oncoming vehicle detection information that is based on detecting an oncoming vehicle; and
    a processor that is configured to generate a control signal for switching the laser light source on or off, based on the oncoming vehicle detection information.

3. The headlamp according to claim 2, wherein the oncoming vehicle detection information is generated by a driver assistance apparatus that comprises a camera and that generates the oncoming vehicle detection information based on the camera capturing an image of a front of a vehicle or an image of a side of a vehicle.

4. The headlamp according to claim 1, wherein the light-emitting module further comprises a light source driving unit that is configured to switch the laser light source on or off based on a control signal.

5. The headlamp according to claim 1, wherein the light-emitting module further comprises a scanner driving unit that is configured to drive movement of the MEMS scanner.

6. The headlamp according to claim 5, wherein the scanner driving unit is configured to move the MEMS scanner horizontally in response to receiving a sinusoidal waveform and move the MEMS scanner vertically in response to receiving a sawtooth waveform.

7. The headlamp according to claim 1, wherein the light-emitting module further comprises an auxiliary condenser lens that is configured to focus light that was reflected by the reflection unit and that passed from a back of the condenser lens to the front of the condenser lens.

8. The headlamp according to claim 1, wherein the laser light source and the reflection unit are offset from the optical axis.

9. The headlamp according to claim 8, wherein the laser light source is spaced apart from the optical axis in a first direction that is perpendicular to the optical axis.

10. The headlamp according to claim 9, wherein:
    the reflection unit is spaced apart from the optical axis in a second direction that is opposite the first direction, or
    the reflection unit is spaced apart from the optical axis in the first direction.

11. The headlamp according to claim 1, wherein the laser light source and the reflection unit are located along an axis that is parallel to the optical axis of the condenser lens.

12. The headlamp according to claim 1, wherein the condenser lens comprises a first half and a second half that are each adjacent to the optical axis, and
    wherein light generated by the laser light source is incident on the first half, light reflected by the MEMS scanner is incident on the second half, and light reflected by the reflection unit is incident on the second half.

13. The headlamp according to claim 1, wherein light that is generated by the laser light source is parallel to the optical axis.

14. The headlamp according to claim 1, wherein the condenser lens is an aspheric lens.

15. The headlamp according to claim 14, wherein the aspheric lens comprises a front surface that is convex; and
wherein the rear surface of the aspheric lens is perpendicular to the optical axis.

16. The headlamp according to claim 1, wherein light incident to the reflection unit has a different wavelength than light reflected by the reflection unit.

17. The headlamp according to claim 16, wherein the reflection unit comprises:
a wavelength conversion layer that is configured to convert a wavelength of incident light; and
a reflection layer that is configured to reflect incident light.

18. A vehicle comprising the headlamp according to claim 1.

19. A headlamp for at least one vehicle, the headlamp comprising a light-emitting module comprising:
a condenser lens that defines an optical axis through a center of the condenser lens and that is configured to focus light incident on a rear surface of the condenser lens;
a laser light source that is located behind the condenser lens and that is configured to generate light toward the condenser lens;
a reflection unit that is located in front of the condenser lens and that is configured to reflect light generated by the laser light source;
a microelectromechanical system (MEMS) scanner that is located behind the condenser lens, that is configured to reflect light reflected by the reflection unit, and that is configured to scan light reflected by the reflection unit by moving horizontally and vertically; and
a wavelength conversion unit that is configured to convert a wavelength of light reflected by the MEMS scanner.

20. A vehicle comprising the headlamp according to claim 19.

* * * * *